United States Patent [19]

Zappa et al.

[11] Patent Number: 5,025,523

[45] Date of Patent: Jun. 25, 1991

[54] APPARATUS FOR REMOTELY DECONTAMINATING REACTOR CAVITY WALLS

[75] Inventors: Donald E. Zappa, North Hills, Pa.; Anthony J. Prisco, Jr., Cinnaminson; Matthew A. Kirchner, Medford, both of N.J.

[73] Assignee: Westinghouse Electric Corp., Pittsburgh, Pa.

[21] Appl. No.: 293,401

[22] Filed: Jan. 4, 1989

[51] Int. Cl.[5] .............................................. A46B 13/04
[52] U.S. Cl. ........................................ 15/98; 15/21.1; 15/50.1; 15/230.12
[58] Field of Search .............. 15/49 R, 50 R, 98, 180, 15/385, 21 R, 87; 51/177, 180

[56] References Cited

U.S. PATENT DOCUMENTS

| | | | |
|---|---|---|---|
| 348,778 | 9/1886 | Reynolds | 15/87 |
| 993,603 | 5/1911 | Jones | 15/87 |
| 1,663,759 | 3/1928 | Ham . | |
| 2,007,073 | 7/1935 | Clarke | 15/49 R |
| 2,142,933 | 1/1939 | Bickford | 15/50 R |
| 2,288,782 | 7/1942 | Brown . | |
| 2,950,494 | 8/1960 | Dickson | 15/50 R |
| 3,333,288 | 8/1967 | Ziegler | 15/50 R |
| 3,366,288 | 1/1968 | Goldschein | 15/50 R |
| 3,562,843 | 2/1971 | Belicka et al. | 15/180 |
| 4,084,281 | 4/1978 | Smith . | |
| 4,097,950 | 7/1978 | Satterfield | 15/49 R |
| 4,351,132 | 9/1982 | Molin . | |
| 4,436,694 | 3/1984 | Vassalotti et al. . | |
| 4,485,517 | 12/1984 | Voigt . | |
| 4,719,659 | 1/1988 | Urakami . | |
| 4,862,548 | 9/1989 | Sergio | 15/49 R |

FOREIGN PATENT DOCUMENTS

| | | | |
|---|---|---|---|
| 1091302 | 10/1960 | Fed. Rep. of Germany | 15/49 R |
| 8001377 | 10/1981 | Netherlands | 15/50 R |

Primary Examiner—Edward L. Roberts
Attorney, Agent, or Firm—W. S. Stevens

[57] ABSTRACT

Apparatus and method for remotely decontaminating, cleaning, scrubbing or polishing the surface of a nuclear reactor cavity wall. The apparatus includes brushes for scrubbing the surface and a drive mechanism for rotating the brushes. The drive mechanism may be a gear drive, a chain and sprocket drive, or a belt and pulley drive. Connected to the brushes and enclosing the drive mechanism is an sealable enclosure. A drive axle extends from the drive mechanism to a motor which is disposed in a housing connected to and located proximate the enclosure. The motor is capable of rotating the drive axle which in turn operates the drive mechanism for rotating the brushes. A fluid dispenser is also provided for dispensing a cleaning agent against the surface to enhance the cleaning ability of the brushes. A container is attached to the housing for receiving ballast therein so that the brushes may exert a bearing pressure against the surface of the wall for suitably scrubbing the surface. Connected to the housing are lifting lugs for receiving lift cables which are connected to an overhead crane. The overhead crane is used to raise and lower the apparatus and to horizontally position the apparatus along the surface of the wall to be decontaminated.

37 Claims, 14 Drawing Sheets

1

APPARATUS FOR REMOTELY DECONTAMINATING REACTOR CAVITY WALLS

BACKGROUND OF THE INVENTION

This invention generally relates to apparatus and methods for cleaning surfaces and more particularly relates to an apparatus and a method for remotely decontaminating, cleaning, or polishing the surfaces of nuclear reactor cavity walls, wherein the apparatus includes brush means for cleaning the surface of the wall, drive means connected to the brush means for rotating the brush means to clean an area of the surface of the wall, means connected to the brush means for simultaneously orbiting the brush means as the brush means rotates to clean a larger area of the surface of the wall. The apparatus may alternatively include a polisher for polishing the surface of the wall.

A nuclear reactor, which is a device for producing heat by fissioning nuclear fuel, must be periodically refueled during what is commonly referred to as a refueling outage. Not only is the reactor refueled during the refueling outage, but maintenance activities may also be performed at that time. During the refueling outage, workmen come into close proximity to the reactor cavity, in which the reactor resides, for refueling and for maintaining the reactor. However, during operation of the nuclear reactor, the reactor cavity walls, which typically have a stainless steel facing, may have become contaminated with radioactive particulate matter adhering to the walls. Hence, to reduce the amount of radiation exposure to the workmen, the reactor cavity walls are typically cleaned before refueling and maintaining the reactor.

Decontamination of reactor cavity walls has been obtained by lowering a workman into the reactor cavity to clean the cavity walls. In one method of cleaning the cavity walls, the workman uses cloths soaked in a suitable cleaner, such as acetone, to manually wipe the surface of the reactor cavity wall for removing the radioactive contaminants. Another method of cleaning reactor cavity walls includes lowering a workman, equipped with a high pressure water hose, into the reactor cavity. The workman then holds the high pressure water hose and directs high pressure water spray against the surface of the wall to remove the contaminants. However, the high pressure water spray impinging the surface of the wall may direct some of the radioactive contaminants from the wall onto the workman, thereby increasing the risk of radiation exposure to the workman. In any case, both methods recited above for decontaminating the walls of the reactor cavity are necessarily time consuming and may result in increased risk of radiation exposure to the workman because workman must be lowered into the cavity. Moreover, reducing the time the workman remains in the cavity, in order to reduce the amount of radiation exposure to that workman, will necessarily result in less surface area being adequately cleaned. In addition, using several workmen to clean the reactor cavity, in order to reduce the radiation exposure to any one workman, is impractical for reasons including increased labor and material costs to perform the decontamination. Therefore, it would be desirable if the reactor cavity walls were cleaned remotely without the need for a workman in the reactor cavity.

A device for remotely decontaminating a nuclear reactor cavity is disclosed by U.S. Pat. No. 4,436,694 issued Mar. 13, 1984 in the name of Michael Vassalotti et al. entitled "Nuclear Reactor Cavity Decontamination Machine". The Vassalotti et al. patent is directed towards a device for decontaminating the walls of boiling water reactor cavities and storage pits. This patent discloses an apparatus comprising a chassis which has wheels in rolling contact with the floor of the cavity and first and second curb wheels in rolling contact with a raised curb surrounding the periphery of the cavity. The apparatus directs high pressure water spray onto the surface of the wall for cleaning the wall. The apparatus is run along the curb, thereby cleaning a horizontal strip of the wall. This operation is repeated until the entire wall is cleaned. The Vassalotti et al. patent, however, does not appear to disclose brush means for cleaning the surface of the wall. Moreover, the Vassalotti et al. patent does not appear to disclose an apparatus for suitably polishing the surface of the cavity wall.

Another device for remotely cleaning reactor cavity walls is disclosed by U.S. Pat. No. 4,351,132 issued Sept. 28, 1982 in the name of Roland Molin entitled "Machine for Cleaning Vertical or Inclined Surfaces". The Molin device comprises at least one roller brush supported by a frame and further comprises a fluid distribution means arranged on the frame for directing jets toward the cavity wall. Although the Molin patent may disclose at least one roller brush and fluid distribution means, the Molin patent does not appear to disclose brush means which rotates for cleaning an area of the surface and which also simultaneously orbits as it rotates for cleaning a larger area of the surface of the wall. Moreover, the Molin patent does not appear to disclose an apparatus for suitably polishing the surface of the cavity wall.

Therefore, while the prior art discloses various devices for remotely cleaning reactor cavity walls, the prior art does not appear to disclose an apparatus and a method for decontaminating or cleaning the surface of reactor cavity walls, wherein the apparatus includes brush means for cleaning the surface, drive means connected to the brush means for rotating the brush means to clean an area of the surface and means connected to the brush means for simultaneously orbiting the brush means as the brush means rotates to clean a larger area of the surface of the wall. Moreover, the prior art does not appear to disclose a polisher for polishing the surface of the cavity wall.

Consequently, what is needed are an apparatus and a method for decontaminating, cleaning or polishing the surface of reactor cavity walls, wherein the apparatus includes brush means for cleaning the surface of the wall, drive means connected to the brush means for rotating the brush means to clean an area of the surface of the wall, means connected to the brush means for simultaneously orbiting the brush means as the brush means rotates to clean a larger area of the surface of the wall. The apparatus may alternatively include a polisher for polishing the surface of the cavity wall.

SUMMARY OF THE INVENTION

Disclosed herein are an apparatus and a method for decontaminating, cleaning or polishing the surface of reactor cavity walls, wherein the apparatus includes brush means for cleaning the surface of the wall, drive means connected to the brush means for rotating the brush means to clean an area of the surface of the wall, means connected the brush means for simultaneously orbiting the brush means as the brush means rotates to clean a larger area of the surface of the wall. Moreover, the apparatus may alternatively include a polisher for polishing the surface of the cavity wall.

More specifically, the apparatus comprises brush means including a first brush and a second brush for decontaminating, cleaning or scrubbing the surface of the cavity wall. The first brush and the second brush are attached to a cylindrical first collet and a cylindrical second collet, respectively, wherein each collet has a longitudinal slot therethrough. The first collet and the second collet each defines a cavity therein for slidably receiving the proximal end portion of an associated first shaft and an associated second shaft, respectively. Each shaft has a proximal end portion having a pin perpendicularly extending therefrom through the slot of its associated collet for rotating the collet and thus for rotating each associated brush when its associated shaft rotates. Moreover, the proximal end portion of each shaft terminates in a circular flange slidably disposed in the associated cavity of each collet. Interposed between each flange and each brush is a spring for continuously biasing each brush against the surface of the wall, so that the surface of the wall is suitably scrubbed. Each shaft also has a distal end portion connected to suitable drive means for rotating each shaft and thus for rotating each brush to which each shaft is connected. The drive means may be a gear drive, a chain drive or a belt drive. The drive means is surrounded by an enclosure for sealably enclosing the drive means.

Connected to the drive means is the proximal end portion of a drive axle for operating the drive means, which is disposed in the enclosure. The enclosure is freely rotatable in a 360 degree plane on and perpendicular to an axis extending longitudinally through the drive axle. The drive axle, which also has a distal end portion, includes a conduit therein extending from the proximal end portion of the drive axle to near the distal end portion of the drive axle for conducting a liquid cleaning or wetting agent, such as deionized or demineralized water, therethrough. In fluid communication with the conduit in the drive axle is a liquid supply coupler which in turn is connected to a fluid reservoir for supplying liquid cleaning or wetting agent to the conduit. The conduit is in fluid communication with fluid dispensing means, such as jet nozzles connected to the enclosure, for dispensing the cleaning or wetting agent against the surface of the wall for wetting the wall to enhance the cleaning efficiency of the brushes. Of course, connected to the distal end portion of the drive axle is a motor for rotating the drive axle. The motor, distal end portion of the drive axle and the liquid supply coupler are disposed in a housing disposed proximate the enclosure for sealably enclosing the motor, distal end portion of the drive axle and liquid supply coupler.

Attached to the exterior of the housing is a container for receiving a predetermined amount of ballast therein, which ballast may be lead bricks or the like. Moreover, any free volume surrounding the motor disposed in the housing may also be filled with ballast. The ballast controls the amount of pressure exerted by the brushes against the wall. Also attached to the housing are horizontal lift bars adapted to receive lifting lugs slidably adjustable along each lift bar. A lifting lug may also be attached to the container. Each lifting lug is capable of receiving a lift cable. Each lift cable is connected to an overhead crane for raising and lowering the apparatus and for horizontally positioning the apparatus along the surface of the wall. By placing sufficient ballast into the container and/or the housing, a principal angular moment of inertia into the surface of the wall is created. In addition, because the free volume surrounding the motor may also be filled with the motor may also be filled with additional ballast, the angular moment of inertia can be adjusted or changed by slidably adjusting the lifting lugs along the lift bars, thus enabling the brushes to make full contact with the surface of the wall to be scrubbed.

The method of the invention may first include disposing ballast into the container attached to the housing and disposing additional ballast into the free volume surrounding the motor for exerting sufficient pressure against the surface of the wall so that the surface may be suitably cleaned or scrubbed. The method of the invention may further include operating the overhead crane so that the apparatus is lowered into the reactor cavity such that the brushes are at the top of the area of the surface of the wall to be decontaminated. Cleaning agent may then be supplied to the conduit in the drive axle for directing the cleaning agent against the surface of the wall. The motor is operated for rotating the drive axle which in turn operates the drive means for rotating the brushes. As the brushes rotate an asymmetrical thrust is created that causes the freely rotatable enclosure to which the brushes are connected to rotate for orbiting the brushes on the surface. Rotating the brushes will clean an area of the surface of the wall; however, simultaneous rotation and orbiting of the brushes will clean a larger area of the surface of the wall. The crane may be operated to horizontally translate the apparatus so that a horizontal strip of the wall is sufficiently cleaned or decontaminated. The apparatus may then be lowered to clean or decontaminate another horizontal strip of the surface, the second horizontal strip overlapping the first horizontal strip. This process can be repeated until the entire surface of the wall is cleaned or decontaminated. After the surface of the wall is cleaned or decontaminated, the apparatus is removed from the reactor cavity via the overhead crane.

Moreover, the brush means may include a polisher connected to the first shaft and the second shaft for polishing the surface of the wall which may be stainless steel. As the first shaft and the second shaft rotate, the first shaft and the second shaft are capable of translating the polisher in an elliptical orbit in a plane about and perpendicular to an axis equidistant between the first and second shafts.

Therefore, an object of the instant invention is to provide an apparatus for remotely cleaning a surface, comprising brush means for cleaning the surface, drive means connected to the brush means for rotating the brush means to clean an area of the surface, and means connected to the brush means for simultaneously orbiting the brush means as the brush means rotates to clean a larger area of the surface.

Another object of the invention is to provide an apparatus for polishing the surface, wherein the brush means is a polisher for polishing the surface.

A further object of the invention is to provide an apparatus for decontaminating the surface of a reactor cavity wall, comprising a first shaft having a proximal end portion and a distal end portion, a second shaft having a proximal end portion and a distal end portion, a first brush connected to the proximal end portion of the first shaft, a second brush connected to the proximal end portion of the second shaft, drive means connected to the distal end portions of the first shaft and the second shaft for rotating the first shaft and the second shaft so that the first brush and the second brush rotate for decontaminating an area of the surface, an enclosure surrounding the drive means and connected to the first shaft and to the second shaft for orbiting the first shaft and the second shaft so that the first brush and the second brush simultaneously orbit as the first brush and second brush rotate for decontaminating a larger area of the surface of the wall.

Yet another object of the invention is to provide an apparatus and a method for decontaminating the surface of the wall, wherein the apparatus includes means attached to the apparatus for pressing the brushes against the surface of the wall.

These and other objects of invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

DESCRIPTION OF THE PREFERRED EMBODIMENTS First Embodiment of The Invention

Disclosed herein are an apparatus and method for remotely decontaminating, cleaning, scrubbing, or polishing surfaces such as the surface of reactor cavity walls.

Figure 1:
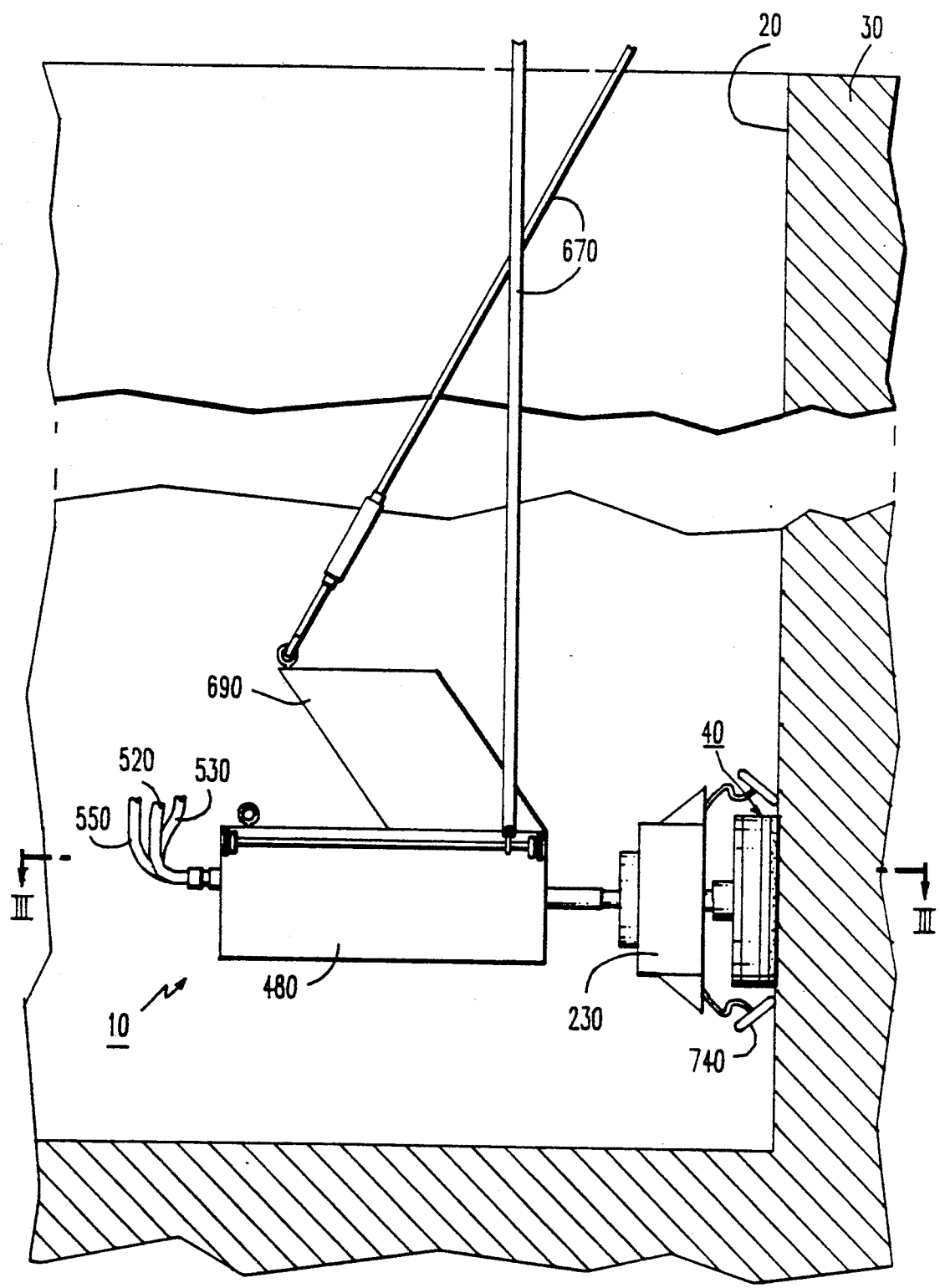
FIG. 1 shows the apparatus of the invention disposed in operative condition for scrubbing the surface of a wall.
Figure 2:
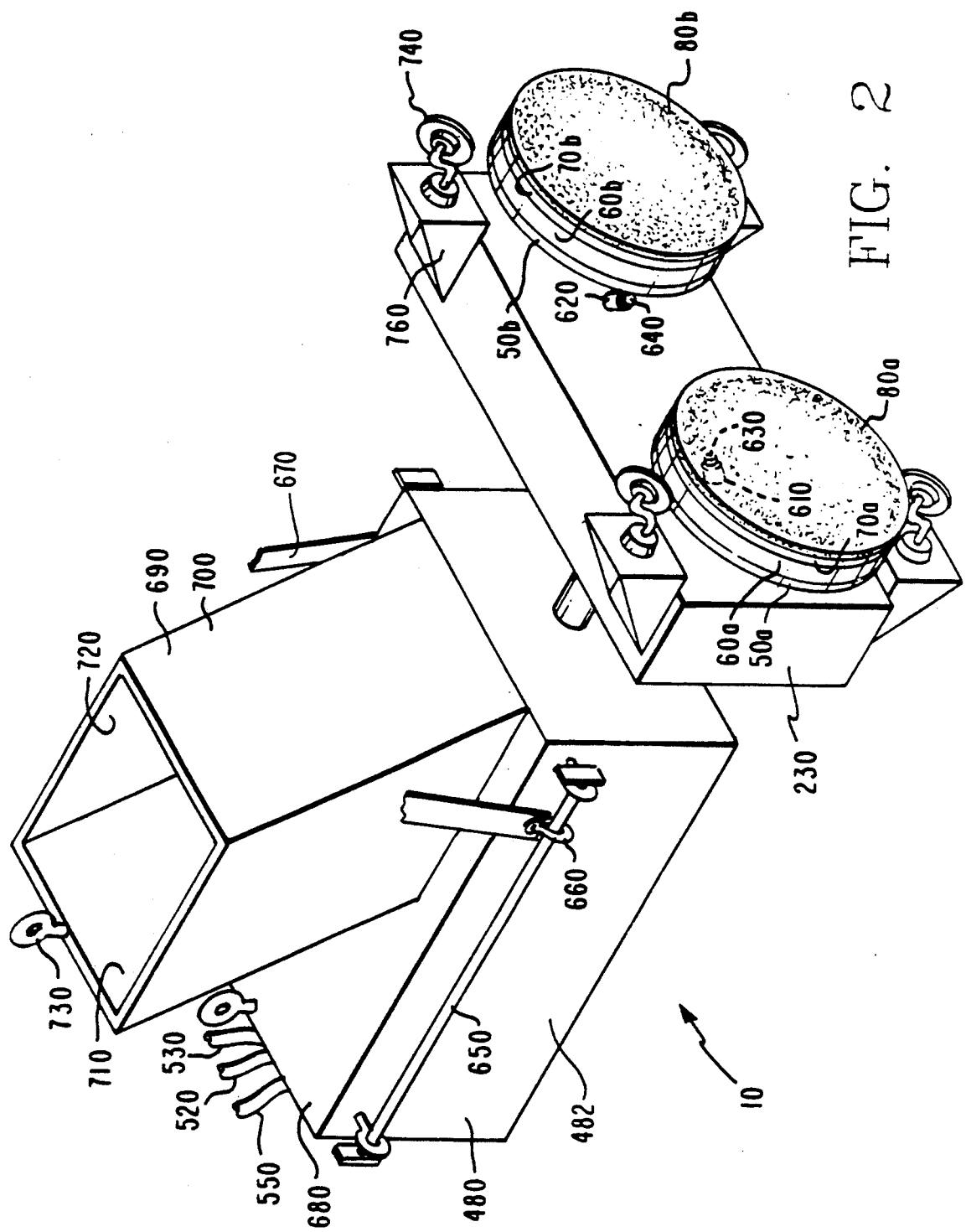
FIG. 2 is a perspective view of a first embodiment of the invention.

Referring to FIGS. 1 and 2, there is illustrated the apparatus of the first embodiment of the invention, generally referred to as 10, operatively disposed for decontaminating, cleaning or scrubbing a surface 20 belonging to a substantially vertical nuclear reactor cavity wall 30, which may be stainless steel. As described in more detail hereinafter, apparatus 10 comprises orbiting rotating brush means, generally referred to as 40, for scrubbing surface 20. Brush means 40 may include at least two spaced-apart mounting disks, such as a first mounting disk 50a for mounting thereon an associated first brush mat 60a and a second mounting disk 50b for mounting thereon an associated second brush mat 60b. First brush mat 60a and second brush mat 60b may be disk-shaped and may be a fibrous material. First brush mat 60a and second brush mat 60b may be attached to their associated mounting disks 50a and 50b by any suitable means, such as by a suitable adhesive. By way of example only, the fibrous material comprising brush mats 60a and 60b may be a coarse surface conditioning material with a "SCOTCH MATE DUAL LOCK PSA" belt back material marketed as "SCOTCH BRITE" and available from the Minnesota Mining and Manufacturing Company located in Saint Paul Minnesota, U.S.A. Mounted on first brush mat 60a and second brush mat 60b are an associated disk-shaped first pad 70a and a second pad 70b, respectively. First pad 70a and second pad 70b may have a multiplicity of densely packed substantially rigid finger-like members (not shown) perpendicular to and protruding a small distance from each side of pads 70a and 70b. The fingers protruding from one side of pads 70a and 70b intimately engage the fibrous material of their respective brush mats 60a and 60b for attaching pads 70a and 70b to their respective brush mats 60a and 60b. Alternatively, each side of pads 70a and 70b may be a "VELCRO"-type material or the like. The "VELCRO"-type material on one side of pads 70a and 70b can be used to adhere pads 70a and 70b to brush mats 60a and 60b.

Still referring to FIGS. 1 and 2, mounted on first pad 70a is an associated disk-shaped first brush 80a for scrubbing surface 20. Moreover, mounted on second pad 70b is an associated disk-shaped second brush 80b for scrubbing surface 20. First brush 80a and second brush 80b may be a fibrous material such as "SCOTCH BRITE" available from Minnesota Mining and Manufacturing Company. As recited hereinabove, the fingers protruding from the one side of pads 70a and 70b intimately engage the fibrous material of their respective brush mats 60a and 60b. The protruding fingers belonging to the other side of pads 70a and 70b not engaging brush mats 60a and 60b intimately engage the fibrous material belonging to each associated brush 80a and 80b for removably attaching brushes 80a and 80b to pads 70a and 70b, respectively. Alternatively, the "VEL-CRO"-type material recited hereinabove may be used to removably adhere brushes 80a and 80b to pads 70a and 70b, respectively. First brush 80a and second brush 80b are removably attached to first pad 70a and second pad 70b, respectively, so that worn brushes can be easily peeled away from pads 70a and 70b and replaced by new brushes, if desired. It will be appreciated that other means may be used for removably attaching brushes 80a and 80b to mounting disks 50a and 50b. Thus, the structures recited hereinabove for attaching brushes 80a and 80b to mounting disks 50a and 50b are merely examples. It will be understood that brush means 40 comprises the combination of mounting disks 50a and 50b, brush mats 60a and 60b, pads 70a and 70b, and brushes 80a and 80b. As described in more detail hereinbelow, brush means 40 is not only capable of rotating but is also capable of simultaneously orbiting in a plane perpendicular to an axis perpendicular to and equidistant between mounting disks 50a and 50b. That is, brushes 80a and 80b are capable of individually rotating and are also capable of simultaneously orbiting about the axis equidistant between mounting disks 50a and 50b.

Figure 3:
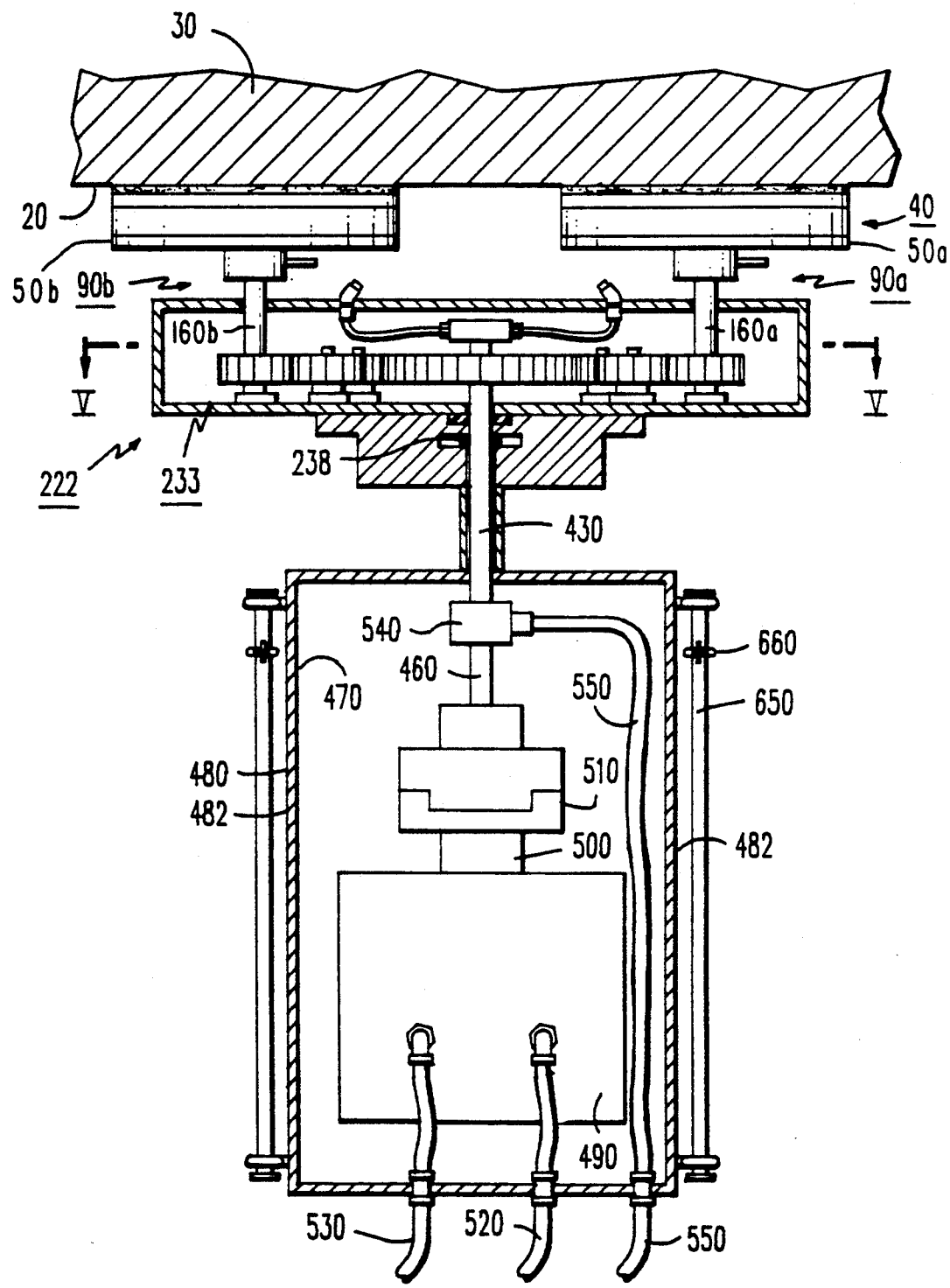
FIG. 3 is a view in partial horizontal section of the first embodiment of the invention taken along section III—III of FIG. 1.
Figure 4:
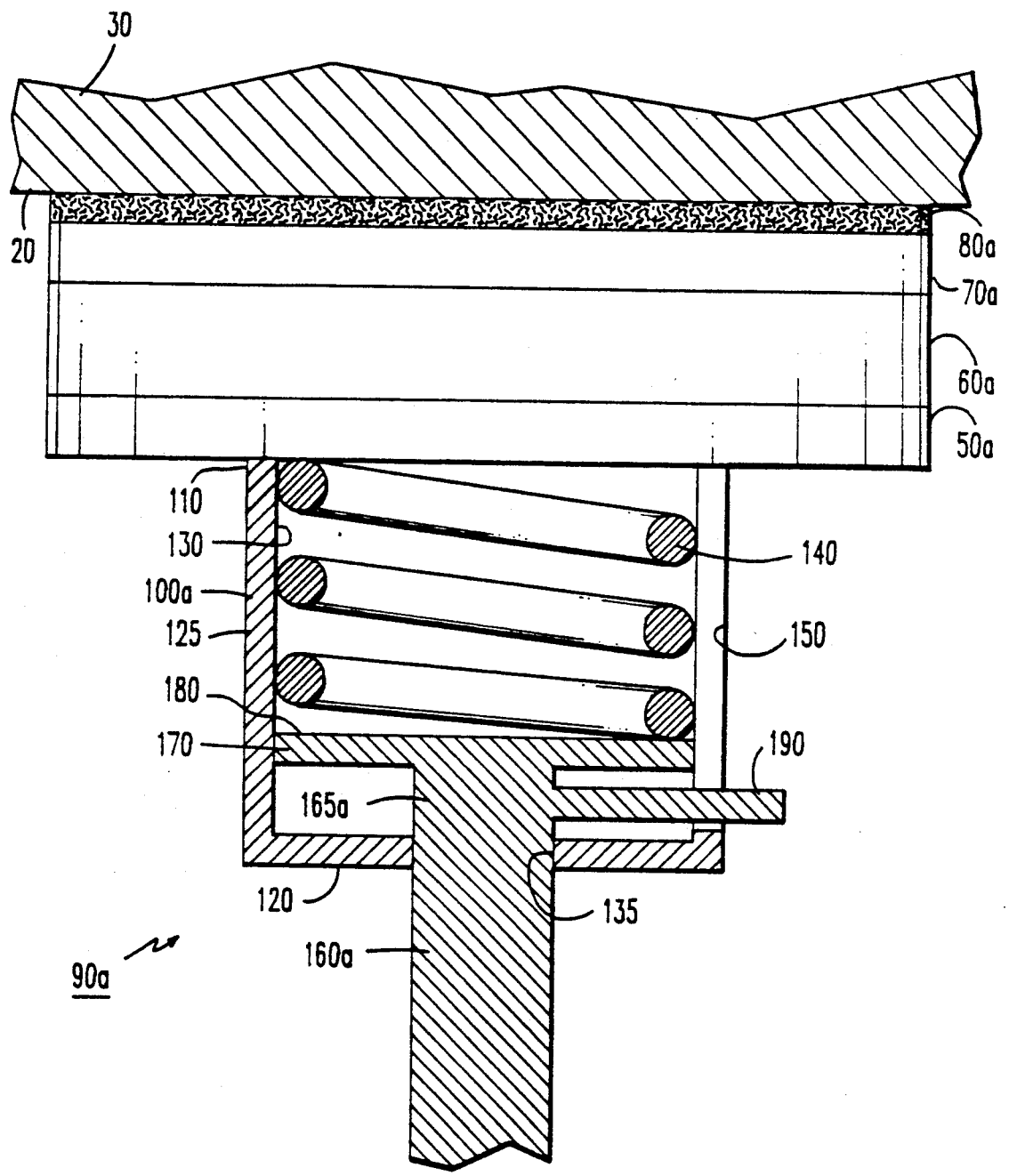
FIG. 4 illustrates a first brush biasing assembly for biasing a first brush against the surface of the wall.
Figure 4A:
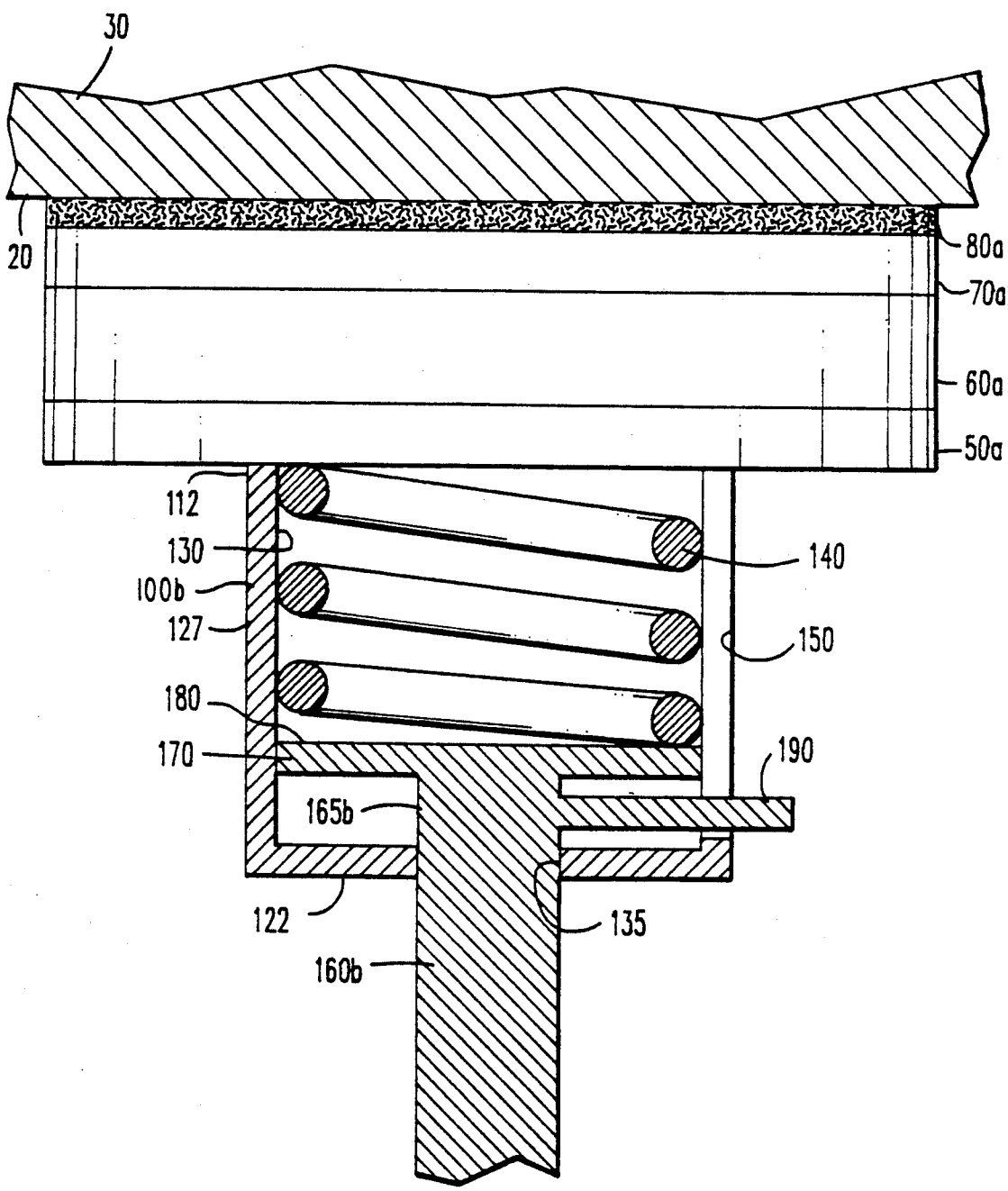
FIG. 4A illustrates a second brush biasing assembly for biasing a second brush against the surface of the wall.

Turning now to FIGS. 3, 4, and 4A, attached to first mounting disk 50a and to second mounting disk 50b are an associated first brush biasing assembly, generally referred to as 90a and an associated second brush biasing assembly, generally referred to as 90b, respectively, for biasing brush means 40 against surface 20. First brush biasing assembly 90a comprises an associated hollow generally cylindrical first collet 100a having a proximal end 110, a distal end 120 and a longitudinal collet wall 125 (see FIG. 4). Moreover, second brush biasing assembly 90b comprises an associated hollow generally cylindrical second collet 100b having a proximal end 112, a distal end 122 and a longitudinal collet wall 127 (see FIG. 4A). Proximal end 110, distal end 120 and collet wall 125 define a generally cylindrical cavity 130 in collet 100a. Similarly, proximal end 112, distal end 122 and collet wall 127 define a generally cylindrical cavity 130 in collet 100b. Each collet 100a and 100b is attached, such as by welding, at their respective proximal ends 110 and 112 to their associated mounting disks 50a and 50b. Moreover, distal ends 120 and 122 are each provided with a hole 135 therethrough for reasons to be recited presently. Disposed in each cavity 130 is biasing means, such as a helically coiled spring 140, for biasing brush means 40 against surface 20. In addition, formed through each wall 125 and 127 is a longitudinal slot 150. Slot 150 extends from each proximal end 110 and 112 to near distal ends 120 and 122, respectively, for reasons more fully described hereinafter.

With particular reference to FIGS. 4 and 4A, slidably extending through hole 135 in collet 100a and 110b are an associated generally cylindrical first shaft 160a and an associated generally cylindrical second shaft 160b, respectively, for rotating brush means 40. Shafts 160a and 160b, which are substantially parallel, have proximal end portions 165a and 165b, respectively, terminating in a circular flange 170 slidably disposed in cavity 130. Flange 170 has a bearing surface 180 thereon for bearing against spring 140, which reposes on bearing surface 180. Formed integrally with each proximal end portion 165a and 165b and perpendicular thereto is a pin 190, which may be generally cylindrical, of width slightly smaller than the smallest width of slot 150 for sliding or reciprocating in slot 150 when collets 100a and 100b slide or reciprocate along shafts 160a and 160b. It will be understood that collets 100a and 100b will slide or reciprocate along shafts 160a and 160b as brushes 80a and 80b traverse an uneven surface 20. Pin 190 perpendicularly extends from proximal end portion 165a and 165b through slot 150 so that pin 190 will contact and exert a force against an edge of slot 150 for rotating collets 100a and 100b as shafts 160a and 160b rotate. As each collet 100a and 100b rotates, their associated mounting disks 50a and 50b will also rotate because first collet 100a and second collet 100b are attached to first mounting disk 50a and to second mounting disk 50b at their respective proximal ends 110 and 112. Of course, first brush 80a and second brush 80b will rotate when their associated first mounting disk 50a and second mounting disk 50b rotate because brushes 80a and 80b are connected to mounting disks 50a and 50b in the manner described hereinabove. As stated hereinabove, each collet 100a and 100b also has hole 135 in their respective distal ends 120 and 122. Hole 135 is formed in distal ends 120 and 122 for slidably receiving proximal end portion 165a and 165b of shafts 160a and 160b, respectively. It will be appreciated that it is important that brush means 40 remain in intimate contact with surface 20 so that surface 20 may be suitably scrubbed. Therefore, even if surface 20 is uneven, spring 140 is capable of continuously biasing brush means 40 into intimate contact with surface 20 for suitably scrubbing surface 20. In this regard, spring 140 will exert a force against mounting disks 50a and 50b because spring 140 is interposed between mounting disks 50a and 50b and flange 170. Because first shaft 160a and second shaft 160b are slidably disposed through hole 135, collets 100a and 100b will slide and reciprocate along first shaft 160a and second shaft 160b, respectively, as brush means 40 traverses uneven surface 20. The sliding and reciprocating action of collets 100a and 100b in combination with the force exerted by spring 140 allow first brush 80a and second brush 80b to remain in intimate contact with surface 20 though surface 20 may be uneven. Therefore, even if surface 20 is uneven, the instant invention will allow it to be suitably scrubbed.

Figure 4B:
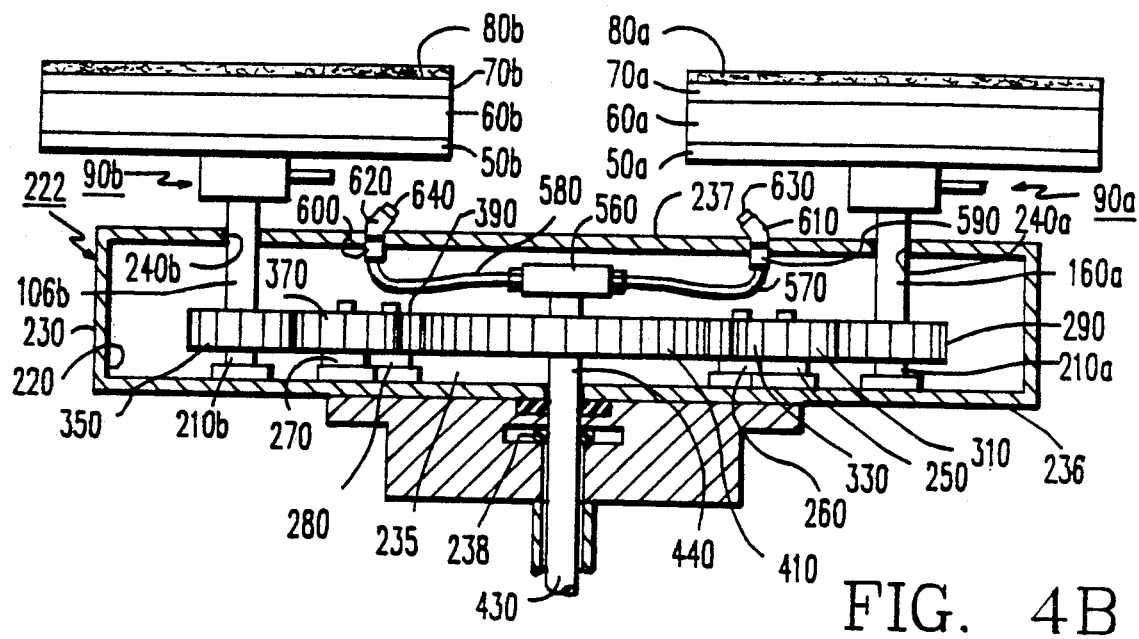
FIG. 4B shows in partial horizontal section drive means belonging to the first embodiment of the invention for rotating the brush means.

As best seen in FIG. 4B, first shaft 160a and second shaft 160b have a distal end portion 210a and 210b, respectively, terminating inside a sealed chamber 220 defined by a brush arm, generally referred to as 222. Brush arm 222 comprises a sealed enclosure 230, which may be stainless steel or like material resistant to corrosion by deionized or demineralized water. Enclosure 230 has six mutually perpendicular panels including a top panel 234 (see FIGS. 7 and 14), a bottom panel 235, a rear side panel 236 and a front side panel 237. Thus, enclosure 230 (i.e., the brush arm 222) may be box-shaped and has a first opening 240a in front side panel 237 for passage therethrough of distal end portion 210a belonging to first shaft 160a. Enclosure 230 also has a second opening 240b in front side panel 237 for passage therethrough of distal end portion 210b belonging to second shaft 160b. Distal end portions 210a and 210b belonging to first shaft 160a and to second shaft 160b, respectively, are suitably rotatably connected to rear side panel 236 so that first shaft 160a and second shaft 160b are capable of rotating although connected to rear side panel 236. Enclosure 230 is capable of freely rotating in a 360 degree plane perpendicular to an axis of rotation parallel to and generally equidistant between shafts 160a and 160b. In this regard, enclosure 230 rides on a main bearing 238 which in turn rides on a drive axle 430 for allowing enclosure 230 to be freely rotatable. As described in more detail hereinafter, rotation of brushes 80a and 80b on surface 20 will generate a couple of the forces of which will allow brushes 80a and 80b to orbit in the plane perpendicular to the axis parallel to and generally equidistant between shafts 160a and 160b.

Figure 5:
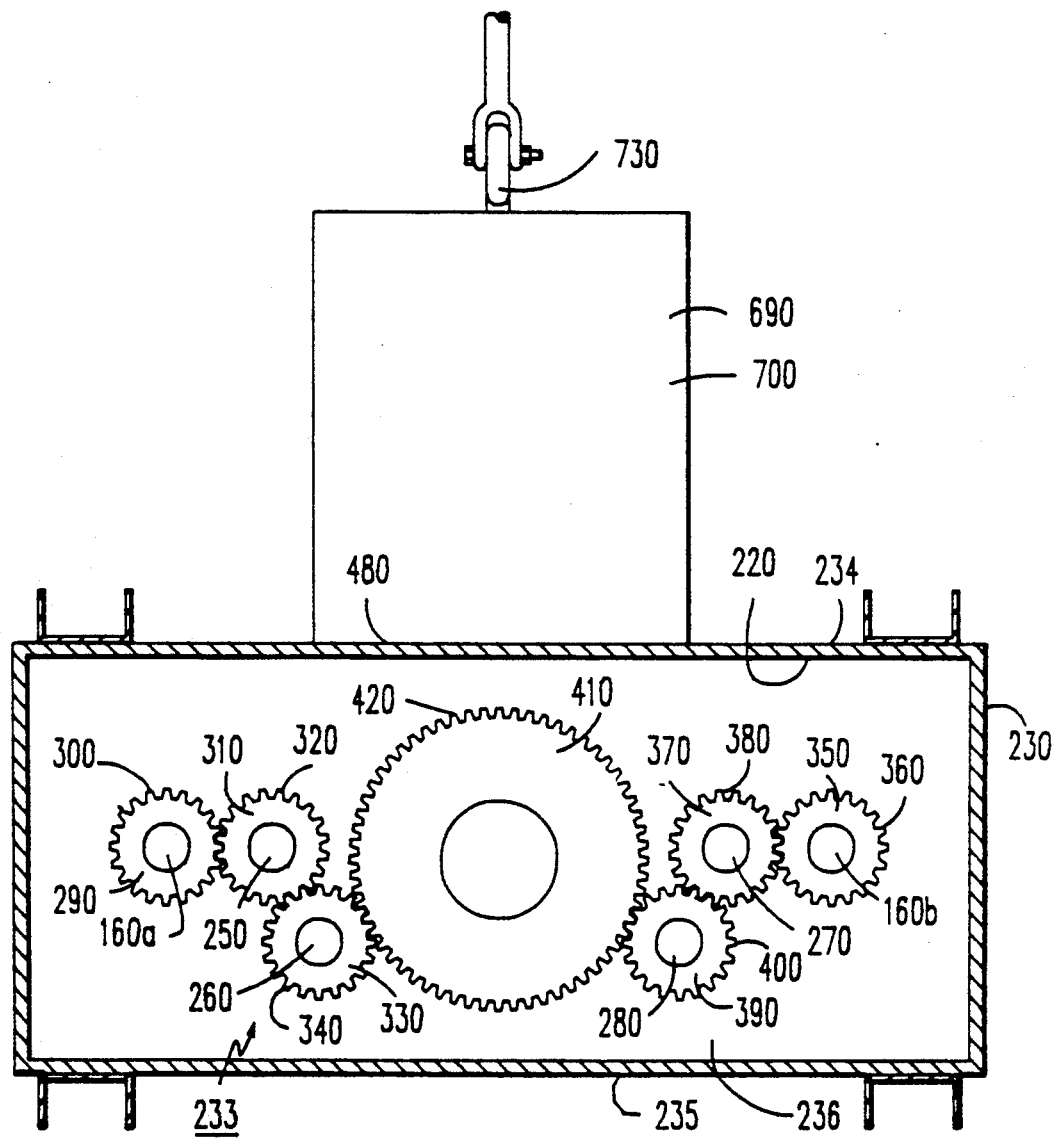
FIG. 5 illustrates, in partial vertical section taken along section V—V of FIG. 3, an enclosure having disposed therein the drive means belonging to the first embodiment of the invention.

Referring to FIGS. 3, 4B and 5, disposed in enclosure 230 is a drive mechanism or drive means, such as a gear drive generally referred to as 233, for rotating brush means 40. Gear drive 233 comprises a generally cylindrical first spindle 250, disposed in chamber 220 and adjacent to distal end portion 210a of first shaft 160a. First spindle 250 is rotatably attached to rear side panel 236. Gear drive 233 also comprises a generally cylindrical second spindle 260 disposed in chamber 220 and adjacent to first spindle 250. Second spindle 260 is also rotatably attached to rear side panel 236. Moreover, gear drive 233 comprises a generally cylindrical third spindle 270 disposed in chamber 220 and adjacent to distal end portion 210b of second shaft 160b. Third spindle 270 is rotatably attached to rear side panel 236. In addition, gear drive 233 further comprises a generally cylindrical fourth spindle 280 disposed in chamber 220 and adjacent to third spindle 270. Fourth spindle 280 is rotatably attached to rear side panel 236.

Still referring to FIGS. 3, 4B and 5, gear drive 233 further includes a first gear 290 having a plurality of first gear teeth 300 therearound. First gear 290 surrounds distal end portion 210a of first shaft 160a and is connected thereto for rotating first shaft 160a. Gear drive 233 also includes a second gear 310 surrounding first spindle 250 and connected thereto. Second gear 310 has a plurality of second gear teeth 320 therearound for matingly engaging first gear teeth 300 belonging to first gear 290. Gear drive 233 further includes a third gear 330 surrounding second spindle 260 and connected thereto. Third gear 330 has a plurality of third gear teeth 340 therearound for matingly engaging second gear teeth 320 belonging to second gear 310. In addition, gear drive 233 includes a fourth gear 350 having a plurality of fourth gear teeth 360 therearound. Fourth gear 350 surrounds distal end portion 210b of second shaft 160b and is connected thereto for rotating second shaft 160b. Moreover, gear drive 233 includes a fifth gear 370 surrounding third spindle 270 and connected thereto. Fifth gear 370 has a plurality of fifth gear teeth 380 therearound for matingly engaging fourth gear teeth 360 belonging to fourth gear 350. Gear drive 233 further includes a sixth gear 390 surrounding fourth spindle 280 and connected thereto. Sixth gear 390 has a plurality of sixth gear teeth 390 therearound for matingly engaging fifth gear teeth 380 belonging to fifth gear 370. As shown in FIGS. 3, 4B and 5, interposed between third gear 330 and sixth gear 390 is a main gear 410 having a plurality of main gear teeth 420 therearound for matingly simultaneously engaging third gear teeth 340 and sixth gear teeth 400. Thus, when main gear 410 rotates, first gear 290, second gear 310, third gear 330, fourth gear 350, fifth gear 370 and sixth gear 390 also rotate. Moreover, it will be appreciated that the configuration of gear drive 233 ensures that the direction of rotation (i.e., clockwise or counter-clockwise) of first gear 290 and fourth gear 350 will be in the same direction. That is, first shaft 160a, to which first gear 290 is connected, and second shaft 160b, to which fourth gear 350 is connected, will rotate in the same direction. Thus, first brush 80a, to which first shaft 160a is connected, and second brush 80b, to which second shaft 160b is connected, will rotate in the same direction to generate a couple for orbiting brushes 80a and 80b in a plane perpendicular to the axis parallel to and equidistant between shafts 160a and 160b. The rotation of brushes 80a and 80b will simultaneously cause brushes 80a and 80b to orbit about the axis defined immediately hereinabove. That is, brushes 80a and 80b are connected via shafts 160a and 160b to enclosure 230, which enclosure 230 is capable of freely rotating (i.e., with relatively low kinematic friction) on drive axle 430. Because brushes 80a and 80b rotate in the same direction, they each acquire an angular momentum pointing in the same direction as the direction of rotation. Thus, enclosure 230 will rotate in the same direction as the direction of angular momentum (i.e., as the direction of rotation of brushes 80a and 80b) when brushes 80a and 80b intimately engage surface 20. The rotation of enclosure 230 will cause brushes 80a and 80b, to which enclosure 230 is connected, to orbit in a plane perpendicular to the axis parallel to and equidistant between shafts 160a and 160b.

Referring to FIG. 3 and 4B, extending through rear side panel 236 and into chamber 230 is a rotatable and generally cylindrical drive axle 430 having a proximal end portion 440 connected to main gear 410 for rotating main gear 410. Drive axle 430 may have a hollow portion longitudinally therethrough defining a conduit 450 (see FIG. 6) for reasons described hereinbelow. As shown in FIG. 3 and 4B, drive axle 430 also has a distal end portion 460 terminating in a compartment 470 defined by a sealed housing 480 which may be box-shaped and thus may have six mutually perpendicular sides including opposing parallel sides 482. Housing 480 may be stainless steel or like material resistant to corrosion by deionized or demineralized water. Disposed in compartment 470 is motor means, such as a variable speed or low speed, reversible high torque air operated motor 490, for rotating drive axle 430. Motor 490 may be of variable speed for varying the speed of rotation of drive axle 430. Moreover, motor 490 may be reversible for reversing the direction of rotation of drive axle 430. A suitable motor 490 may be selected from those motors readily available in the art, such as a "MODEL DV1-U" air drive motor available from Pneumatic Systems, Incorporated located in Dallas, Texas, U.S.A. Moreover, extending from motor 490 is a motor shaft 500 for rotating drive axle 430. Interposed between and coupled to motor shaft 500 and to drive axle 430 is a drive coupling 510 for coupling motor shaft 510 to drive axle 430 so that drive axle 430 rotates as motor shaft 500 rotates. Attached to motor 490 is an air supply line 520 for supplying air to motor 490 to operate motor 490 if motor 490 is an air operated motor. Also attached to motor 490 is an air return line 530 for removing or conducting the air necessarily exhausted from the operation of motor 490. It will be understood that air supply line 520 and air return line 530 may be suitable hoses fabricated from a flexible material, such as rubber or the like.

Figure 6:
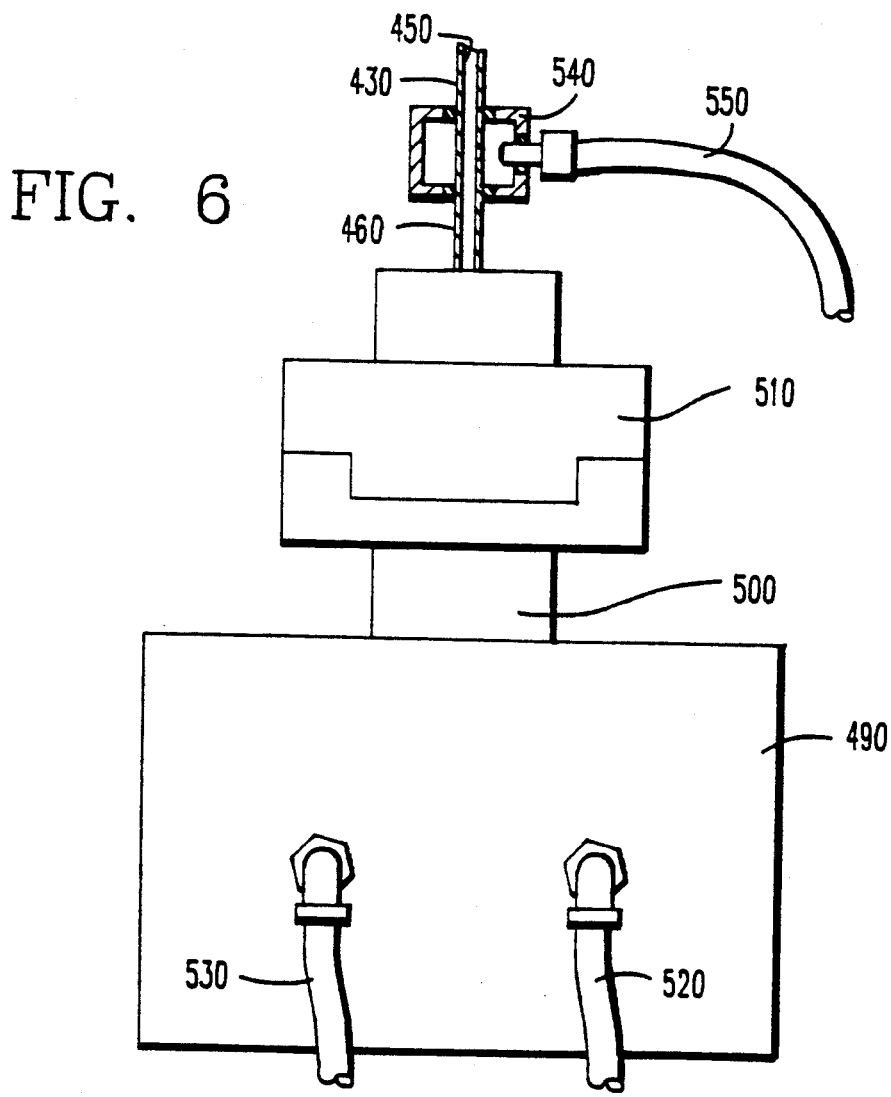
FIG. 6 is a partial sectional view of a liquid supply coupler with parts removed for clarity.

As best seen in FIGS. 3, 4B and 6, disposed in compartment 470 and sealingly surrounding drive axle 430 is a liquid supply coupler 540 for supplying a cleaning or wetting agent, such as deionized or demineralized water, to conduit 450. A suitable liquid supply coupler 540 may be selected from those available in the art, such as available from Flow Industries, Incorporated located in Kent, Washington, U.S.A. Connected to liquid supply coupler 540 is a liquid supply line 550 for supplying the cleaning or wetting agent to liquid supply coupler 540 and thence to conduit 450. It will be understood that liquid supply line 550 may be a suitable hose fabricated from a flexible material, such as rubber or the like. As described presently, conduit 450 conducts the wetting agent to surface 20 for dispensing the wetting agent against surface 20 to enhance the scrubbing effectiveness of brush means 40. In this regard, sealingly connected to proximal end 440 of drive axle 430 is a conduit manifold 560 having a plenum chamber (not shown) therein in fluid communication with conduit 450. In fluid communication with the plenum chamber are a first tube 570 and a second tube 580 extending therefrom for conducting the wetting agent out of the plenum chamber. First tube 570 and second tube 580 may be a suitable flexible plastic or the like. Disposed through and attached, such as by welding, in front side panel 237 are a first fixture 590 and a second fixture 600 that are sealingly connected to first tube 570 and to second tube 580, respectively, for receiving the wetting agent from tubes 570 and 580. First fixture 590 and second fixture 600, which are capable of conducting the wetting agent therethrough, may be hollow elbow pipe joints or the like. Sealingly attached to first fixture 590 is a first jet nozzle connection, 610, which may be generally tubular. Similarly, sealingly attached to second fixture 600 is a second jet nozzle connection 620, which may be generally tubular. First jet nozzle connection 610 and second jet nozzle connection 620 may be inclined at a predetermined angle with respect to front side panel 237 so that nozzle connections 610 and 620 are capable of redirecting the liquid wetting agent received from fixtures 590 and 600 at a predetermined angle with respect to front side panel 237 so that the wetting agent flowing through jet nozzle connections 610 and 620 substantially pass through the space between spaced-apart brushes 80a and 80b. Connected to first jet nozzle connection 610 and to second jet nozzle connection 620 are fluid dispensing means such as a first jet nozzle 630 and a second jet nozzle 640, respectively, each for directing a jet spray of the wetting agent against surface 20. First jet nozzle 630 and second jet nozzle 640 are preferably capable of being adjustably inclined such that the liquid flowing through jet nozzles 630 and 640 substantially pass through the space defined by spaced-apart brushes 80a and 80b. Moreover, adjustably inclined jet nozzles 630 and 640 can be adjusted such that the liquid flowing through jet nozzles 630 and 640 will impinge and wet areas of surface 20 where brushes 80a and 80b will scrub. It is preferable that the wetting agent pass through the space between brushes 80a and 80b so that brushes 80a and 80b do not substantially intercept the wetting agent impinging surface 20. In this manner, more liquid will impinge surface 20 because the path of fluid flow from first jet nozzle 630 and second jet nozzle 640 to surface 20 will not be substantially blocked or substantially intercepted by brushes 80a and 80b. Moreover, first jet nozzle 630 may have external threads thereon and first nozzle connection 510 may have internal threads therein for sealingly threadably connecting first jet nozzle 630 and first nozzle connection 510. Similarly, second jet nozzle 640 may have external threads thereon and second nozzle connection 620 may have internal threads therein for sealingly threadably connecting second jet nozzle 640 and second nozzle connection 620. The threaded connection of first jet nozzle 630 and first nozzle connection 510 will enable first jet nozzle 630 to be easily threadably exchanged with a differently configured first jet nozzle 630 having different flow characteristics (e.g., stream versus fine spray). Similarly, the threaded connection of second jet nozzle 640 and second nozzle connection 620 will enable second jet nozzle 640 to be easily threadably exchanged with a differently configured second jet nozzle 640 having different flow characteristics (e.g., stream versus fine spray). In this manner, the size of the fluid jet impinging surface 20 may be varied from a stream to a fine mist or spray by exchanging jet nozzles, if desired, so that a precise area of surface 20 impinged by the fluid jet is smaller or larger, respectively. Thus, first jet nozzle 630 and second jet nozzle 640 function as adjustable variable fluid impinging means for adjustably variably impinging the fluid upon surface 20 because the angle of inclination of nozzles 630 and 640 can be adjusted and because the size of the fluid jet can be varied.

Returning to FIG. 2, connected to each side 482 of housing 480 is an elongated lift rod or lift bar 650 for providing means for lifting apparatus 10. In this regard, adjustably slidably secured to each lift bar 650 is a lifting lug 660 for lifting apparatus 10 and for balancing and tilting apparatus 10. Each lifting lug 660 is capable of being connected to a lift cable 670 (see FIG. 1) for lifting and for repositioning (i.e., vertically and horizontally) apparatus 10 along surface 20.

Again referring to FIG. 2, attached to a top side 680 of housing 480 is a parallelepiped hollow container 690 having a front side 700 and a rear side 710 both sloping away from enclosure 230. Container 690 defines a hollow portion 720 for receiving a predetermined quantity of ballast (not shown) therein, such as lead bricks for balancing apparatus 10 against surface 20. As described in more detail hereinbelow, the ballast assists in maintaining brush means 40 in intimate contact with surface 20 by controlling the location of the center of gravity of apparatus 10. It will be understood that controlling the location of the center of gravity of apparatus 10 also controls the pressure of brushes 80a and 80b bearing against surface 20. The amount of ballast into container 690 may be varied for varying the pressure of brushes 80a and 80b bearing against surface 20. Moreover, attached to container 690 may be another lifting lug 730 for lifting apparatus 10 and for tilting apparatus 10 into surface 20. It will be appreciated that lifting lugs 660 are capable of being repositioned along their respective lifting bars 650 by sliding lifting lugs 660 along their associated lifting bars 650 so that apparatus 10 can be balanced against surface 20 and/or tilted into surface 20.

Figure 7:
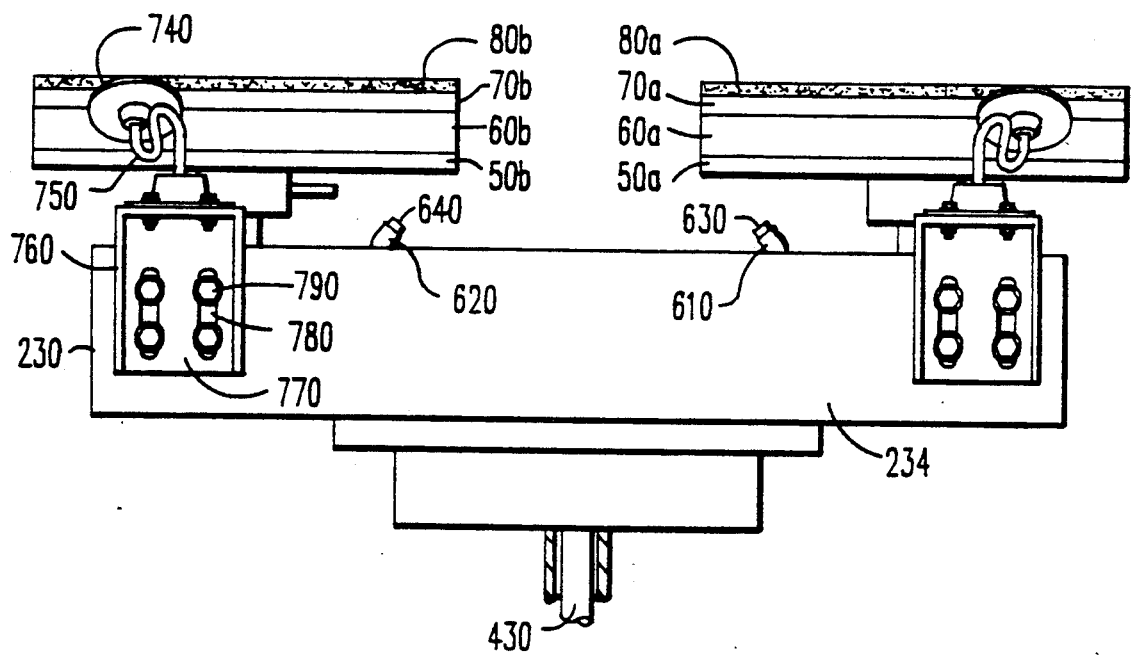
FIG. 7 illustrates the apparatus of the invention having a caster attached to a caster support.

Referring now to FIGS. 1, 2, and 7, a plurality of casters 740 are provided for allowing apparatus 10 to glide or slide along surface 20 when apparatus 10 is repositioned (i.e., horizontally and vertically) on surface 20. Casters 740, which are preferably mounted on enclosure 230, may be generally spherical, disk-shaped or any suitable geometry for slidably contacting surface 20. Moreover, the material of casters 740 may be selected such that the coefficient of sliding friction of that material on the material comprising surface 20 is relatively low so that casters 740 may easily slide along surface 20. In addition, the material and configuration of casters 740 may be selected such that casters 740 are incapable of substantially marring surface 20. It is important that surface 20 not become substantially marred because substantial marring of surface 20 may produce undesirable localized sites for deposition of radioactive particulate contaminates. Thus, casters 740 may be a suitable plastic material or the like. As described in more detail hereinafter, there may be four casters 740, wherein two casters 740 are spaced-apart and mounted on top panel 234 and two casters 740 are spaced-apart and mounted on bottom panel 235 of enclosure 230. Attached to each caster 740 is a caster leg 750 (see FIG. 7) configured for attaching each caster 740 to an associated caster support 760. Each caster support 760 is adjustably connected to its associated top panel 234 or bottom panel 235. Each caster leg 750, having the associated caster 740 connected thereto, may dispose caster 740 at an oblique angle with respect to surface 20 to aid in sliding apparatus 10 along surface 20. Moreover, each caster 740 in connected to its associated caster leg 750 such that it may swivel about the point where caster 740 is connected to caster leg 750 to aid in sliding apparatus 10 along surface 20. By way of example only, each caster 740 may be approximately three inches in diameter. Moreover, each caster support 760 is individually positionable, as described hereinbelow, for positioning each caster 740 and for positioning brushes 80a and 80b against surface 20. Each caster support 760 has a deck flange 770 mountable on its associated top panel 234 or bottom panel 235. Alternatively, casters 740 and caster supports 760 may be similarly mounted on the sides of enclosure 230. Deck flange 770 has an elongated aperture 780 therethrough capable of receiving an adjustable fastener 790 for mounting caster support 740 on its associated top panel 234 or bottom panel 235. Fastener 790 may be a threaded screw having a threaded shank portion (not shown) that is threaded through an opposing hole (not shown) formed through top panel 234 or bottom panel 235. The threaded shank portion may terminate in a shank head larger than the width of elongated aperture 780 so that fastener 790 can not pass through aperture 780. Thus, the position of each caster 740 with respect to surface 20 may be adjusted by unthreading fastener 790 from its corresponding hole in enclosure 230, moving caster support 760 either toward or away from front panel 237, as desired, and rethreading fastener 790 into its corresponding hole in enclosure 230 such that each caster support 760 is then affixed to its associated top panel 234 or bottom panel 235. It is important that apparatus 10 have caster supports 760 which are capable of positioning each caster 740 with respect to surface 20, as described hereinabove, so that brushes 80a and 80b may be suitably positioned flush against surface 20 for suitably scrubbing surface 20.

Second Embodiment of The Invention

Figure 8:
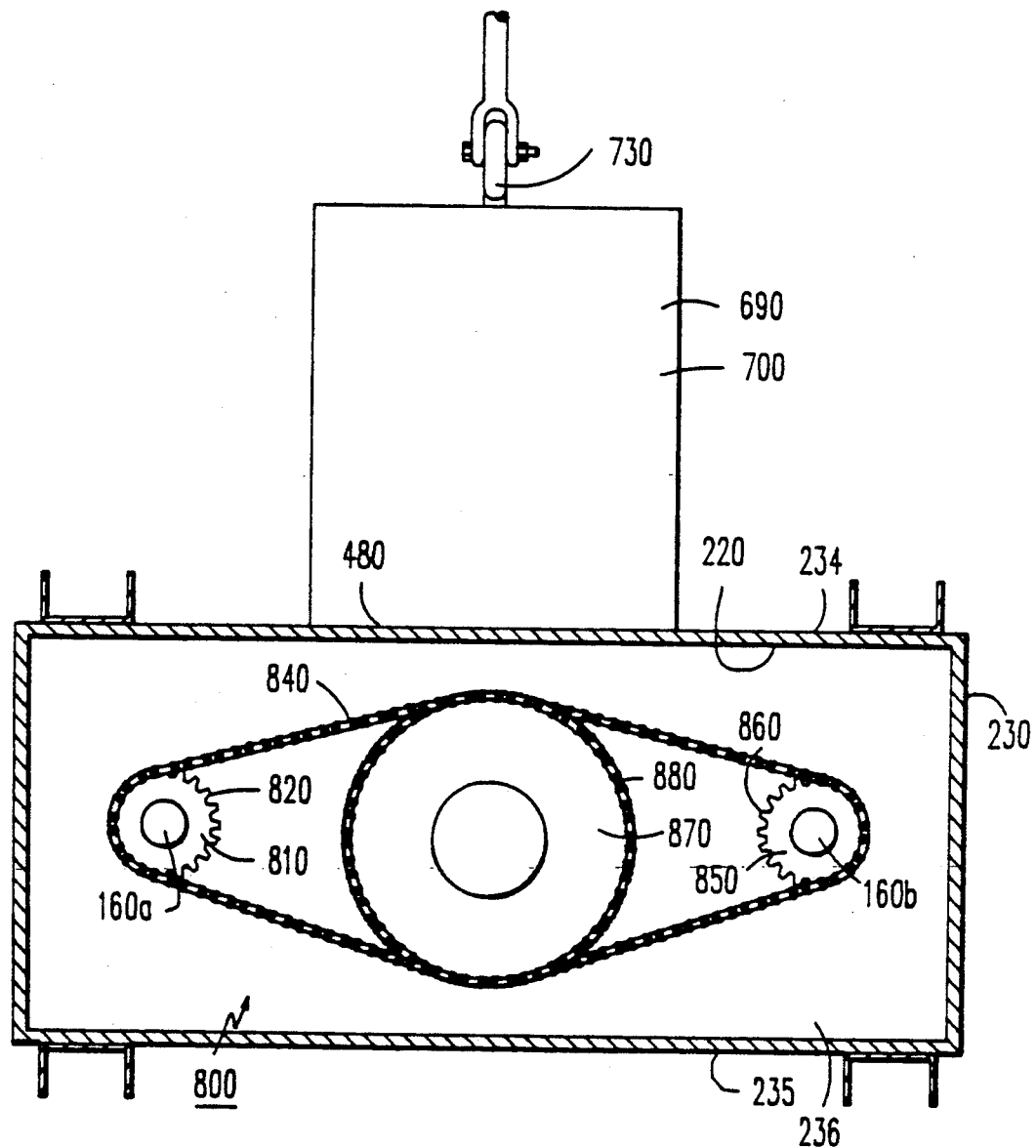
FIG. 8 is a view in partial vertical section of the enclosure having disposed therein the drive means belonging to a second embodiment of the invention.
Figure 9:
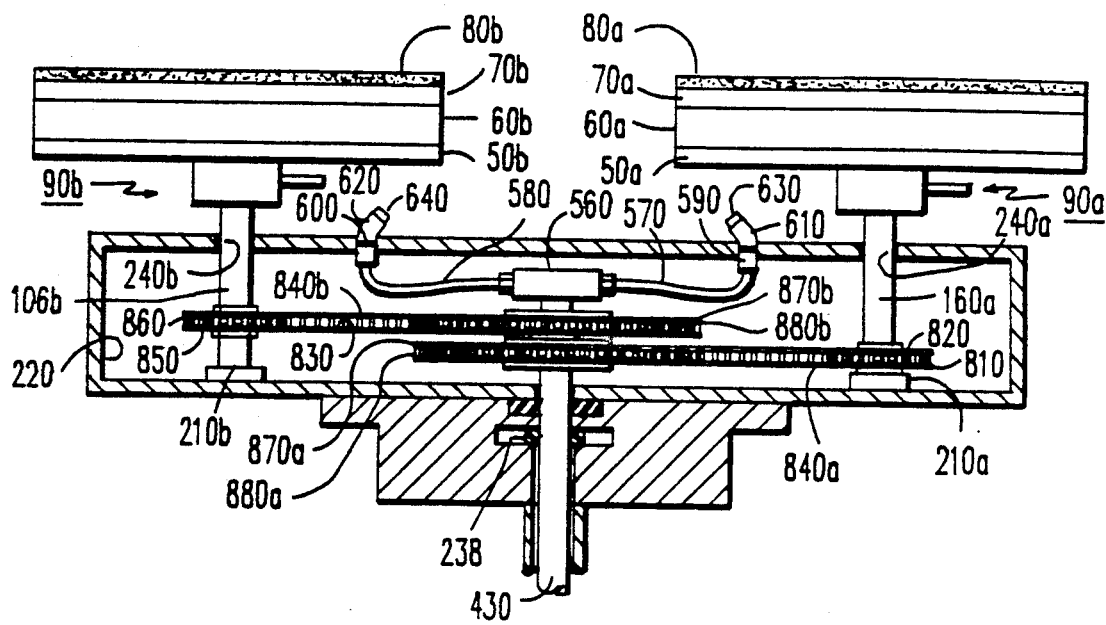
FIG. 9 illustrates, in partial horizontal section, the enclosure having disposed therein the drive means belonging to the second embodiment of the invention.

Referring to FIGS. 8 and 9, there is shown the second embodiment of the invention. The second embodiment of the invention is substantially similar to the first embodiment of the invention except that the drive means is a chain drive, generally referred to as 800, rather than gear drive 233. Chain drive 800 comprises a generally cylindrical first sprocket 810 having a plurality of first sprocket teeth 820 therearound for engaging a plurality of sprocket holes 830 defined by a first chain 840a. Chain drive 800 further comprises a generally cylindrical second sprocket 850 having a plurality of second sprocket teeth 860 therearound for engaging sprocket holes 830 defined by a second chain 840b. Moreover, chain drive 800 also comprises a first main sprocket 870a and a second main sprocket 870b interposed between first sprocket 810 and second sprocket 850 for driving chains 840a and 840b and therefore for rotating first sprocket 810 and second sprocket 850. Main sprockets 870a and 870b have a plurality of main sprocket teeth 880a and 880b, respectively, therearound for engaging the associated sprocket holes 830 of chains 840a and 840b. As shown in FIGS. 8 and 9, first chain 840a extends around first sprocket 810 and main sprocket 870a so that sprocket holes 830 simultaneously engage first sprocket teeth 820 and main sprocket teeth 880a. Similarly, second chain 840b extends around second sprocket 850 and main sprocket 870b so that sprocket holes 830 simultaneously engage second sprocket teeth 860 and main sprocket teeth 880b. It will be understood that first sprocket 810, second sprocket 850 and main sprockets 870a and 879b simultaneously rotate in the same direction (i.e., either clockwise or counter-clockwise) depending on the direction of rotation of drive axle 430. It will be further understood that in this second embodiment of the invention, first sprocket 810 and second sprocket 850 circumscribe first shaft 160a and second shaft 160b, respectively. It will be appreciated that in this second embodiment of the invention, first spindle 250, second spindle 260, third spindle 270, and fourth spindle 280 belonging to the first embodiment of the invention are not used and thus may be eliminated for conserving space in enclosure 230 and for decreasing the weight of apparatus 10 which is suspended by lift cables 670.

Third Embodiment of The Invention

Figure 11:
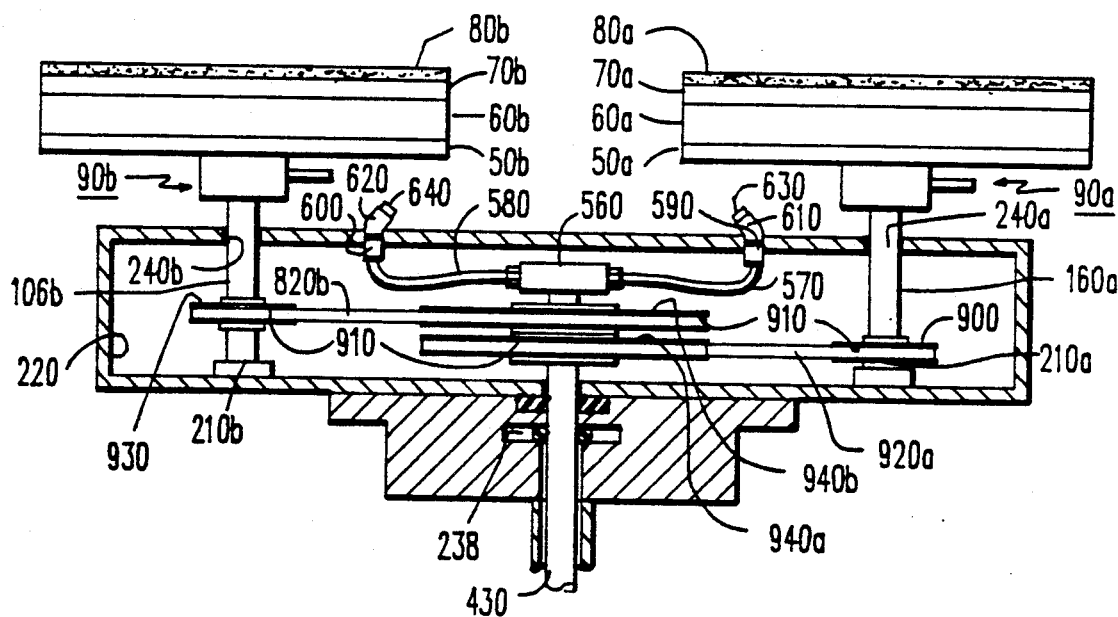
FIG. 11 illustrates, in partial horizontal section, the enclosure having disposed therein the drive means belonging to the third embodiment of the invention.
Figure 10:
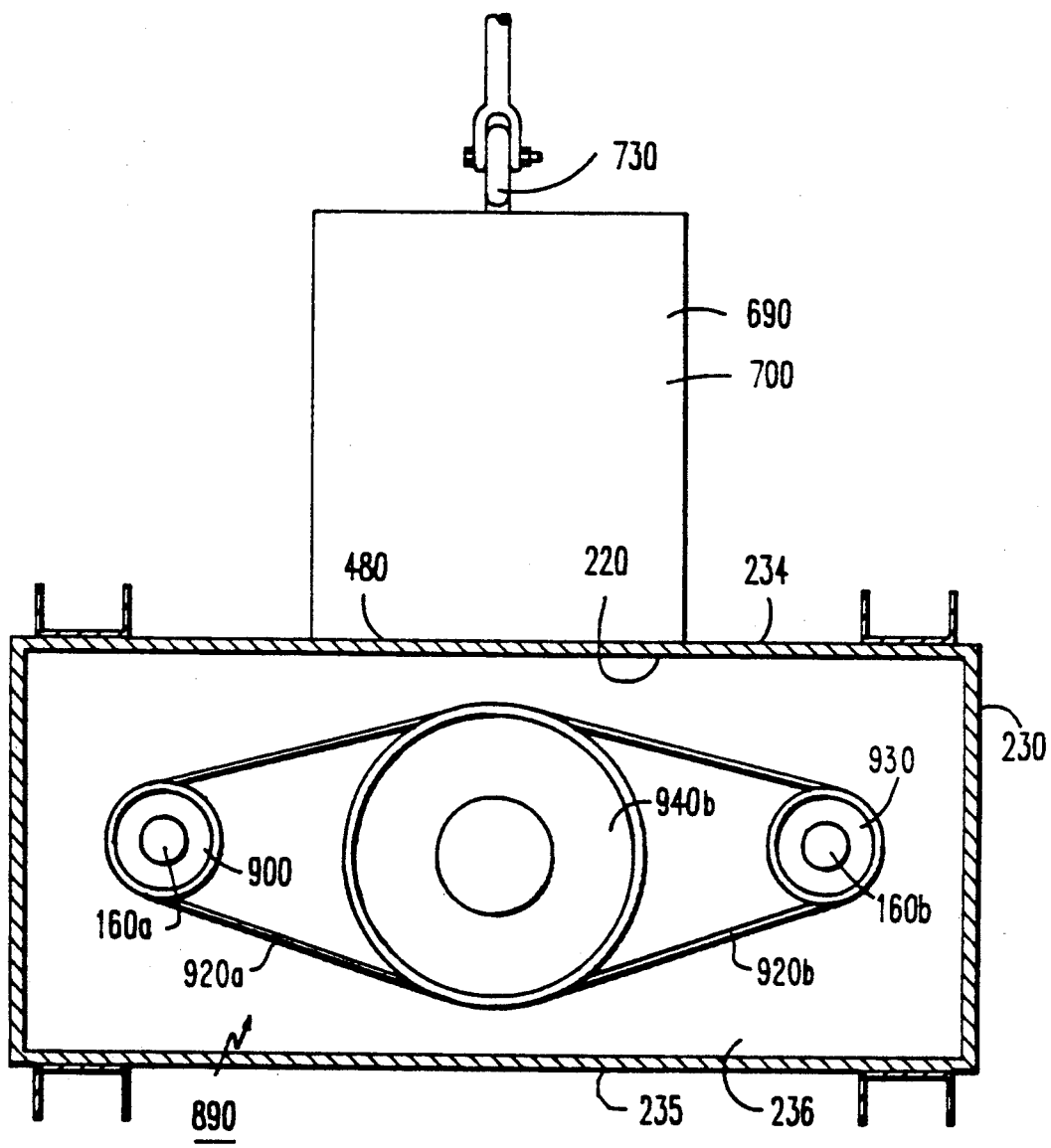
FIG. 10 is a view in partial vertical section of the enclosure having disposed therein the drive means belonging to a third embodiment of the invention.

Referring to FIGS. 10 and 11, there is shown the third embodiment of the invention which is substantially similar to the first embodiment of the invention except that the drive means is a belt drive, generally referred to as 890, rather than gear drive 233. Belt drive 890 comprises a first pulley 900 having a generally V-shaped (in transverse cross section) groove 910 in the marginal edge thereof extending around the circumference of first pulley 900 for matingly receiving a substantially flexible first belt 920a. Belt 920a has a generally V-shaped transverse cross section for matingly engaging groove 910. Belt drive 890 further comprises a second pulley 930 having the V-shaped groove 910 in the marginal edge thereof extending around the circumference of second pulley 930 for matingly receiving a second belt 920b. Moreover, belt drive 890 also comprises a first main pulley 940a interposed between first pulley 900 and second pulley 930 for driving first belt 920a and therefore for rotating first pulley 900. First main pulley 940a has groove 910 extending around the circumference thereof for matingly receiving first belt 920a therein. As shown in FIGS. 10 and 11, first belt 920a extends around first pulley 900 and first main pulley 940a for rotating first pulley 900. Belt drive 890 further comprises a second main pulley 940b interposed between first pulley 900 and second pulley 930 for driving second belt 920b and therefore for rotating second pulley 930. As shown in FIGS. 10 and 11, first belt 920a extends around first pulley 900 and first main pulley 940a. Similarly, second belt 920b extends around second pulley 930 and second main pulley 940b. It will be understood that first pulley 900, second pulley 930, and main pulleys 940a and 940b simultaneously rotate in the same direction (i.e., either clockwise or counter-clockwise) depending on the direction of rotation of drive axle 430. It will be further understood that in this third embodiment of the invention, first pulley 900 and second pulley 930 circumscribe first shaft 160a and second shaft 160b, respectively. In this third embodiment of the invention, first spindle 250, second spindle 260, third spindle 270, and fourth spindle 280 belonging to the first embodiment of the invention are not used and thus may be eliminated for conserving space in enclosure 230 and for decreasing the weight of apparatus 10 which is suspended by lift cables 670.

Fourth Embodiment of The Invention

Figure 13:
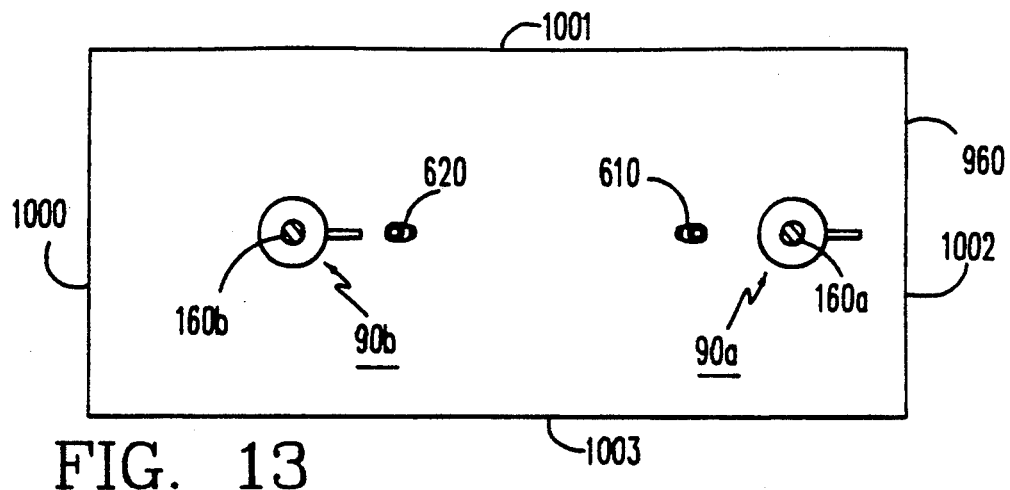
FIG. 13 is a view taken along section XIII—XIII of FIG. 12 illustrating the polisher belonging to the fourth embodiment of the invention.
Figure 12:
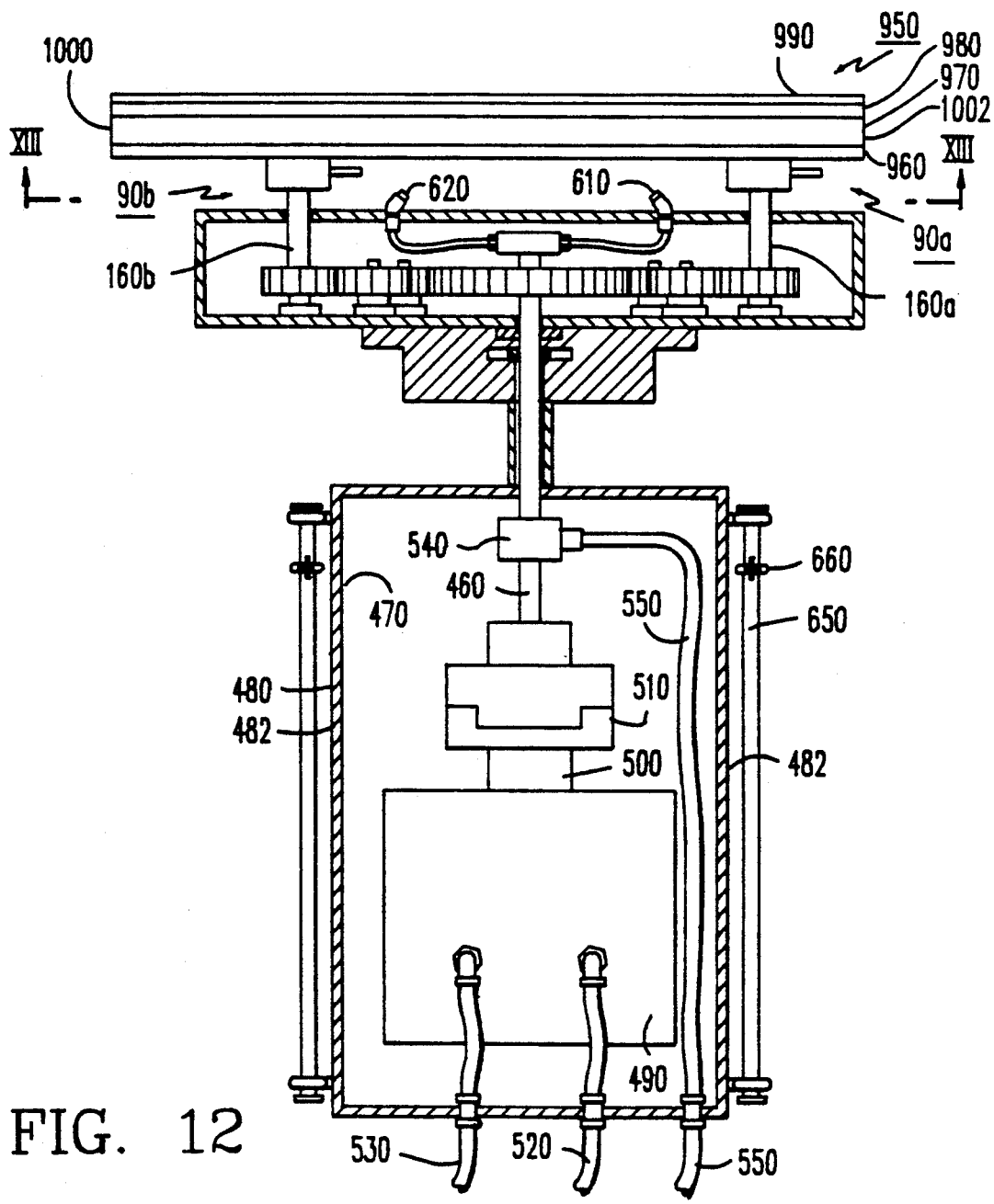
FIG. 12 is a view in partial horizontal section of a fourth embodiment of the invention illustrating a polisher.

Referring to FIGS. 12 and 13, there is illustrated the fourth embodiment of the invention. The fourth embodiment of the invention is capable of polishing surface 20, which may be stainless steel or the like, to remove radioactive particulate matter and to improve the aesthetic appearance of surface 20 by producing a higher coefficient of reflectivity on surface 20 so that a sheen is provided to surface 20. As described in more detail hereinbelow, this fourth embodiment of the invention is substantially similar to the first embodiment of the invention except that brush means 40 is a polisher generally referred to as 950 for polishing surface 20 and except that first shaft 160a and second shaft 160b will translate polisher 950 in an elliptical orbit in a plane perpendicular to the axis parallel to and equidistant between shafts 160a and 160b for suitably polishing surface 20.

As shown in FIGS. 12 and 13, polisher 950 comprises a mounting platform 960 for mounting thereon an associated mounting mat 970 which may be substantially rectangular. Mounting mat 970 may be a fibrous material. Mounting mat 970 may be attached to its associated mounting platform 960 by any suitable means, such as by a suitable adhesive. Mounted on mounting mat 970 is an attachment layer 980. Attachment layer 980. may have a multiplicity of densely packed substantially rigid finger-like members (not shown) perpendicular to and protruding a small distance from the front and rear sides of attachment layer 980. The fingers protruding from the rear side of attachment layer 980 intimately engage the fibrous material of mounting mat 970 for attaching attachment layer 980 to mounting mat 970. Alternatively, the front and rear sides of attachment layer 980 may be a "VELCRO"-type material or the like. The "VELCRO"-type material on the rear side of attachment layer 980 can be used to adhere attachment layer 980 to mounting mat 970.

Referring to FIG. 12, mounted on attachment layer 980 is an associated abrasive brush 990, which may be generally rectangular, for sufficiently abrading or polishing surface 20. Abrasive brush 990 may be a fibrous material such as "SCOTCH BRITE" available from the Minnesota Mining and Manufacturing Company. As described hereinabove, the fingers protruding from the rear side of attachment layer 980 intimately engage the fibrous material of mounting mat 970. The protruding fingers belonging to the front side of attachment layer 980 not engaging mounting mat 970 intimately engage the fibrous material belonging to abrasive brush 990 for removably attaching abrasive brush 990 to attachment layer 980. Alternatively, the "VELCRO"-type material recited hereinabove may be used to adhere abrasive brush 990 to attachment layer 980. Abrasive brush 990 is removably attached to attachment layer 980 so that a worn abrasive brush 990 can be easily removed and replaced by a new abrasive brush, if desired. It will be appreciated that several means may be used for removably attaching abrasive brush 990 to mounting platform 960 of which the structures recited hereinabove are merely examples. It will be understood that polisher 950 comprises the combination of mounting platform 960, mounting mat 970, attachment layer 980 and abrasive brush 990. Moreover, it will be further understood that mounting mat 970, attachment layer 980 and abrasive brush 990 may be of the same material as mats 60a-60b, pads 70a-70b, and brushes 80a-80b (see FIG. 3), respectively, if desired. It will be appreciated that when polisher 950 is used to polish surface 20, supply of fluid to surface 20 is not necessary. Therefore, when apparatus 10 is used to polish surface 20, fluid need not be supplied through liquid supply line 550.

As best seen in FIGS. 12 and 13, mounting platform 960 includes four mutually perpendicular marginal edges 1000, 1001, 1002 and 1003. Brush biasing assemblies 90a and 90b, which are attached to mounting platform 960, may be disposed nearer to one marginal edge than to the other three marginal edges. As shown in FIG. 13, brush biasing assemblies 90a and 90b are disposed nearer to marginal edge 1002 than to marginal edges 1000, 1001 and 1003. Alternatively, brush biasing assemblies 90a and 90b may be disposed nearer to two marginal edges (e.g., 1001 and 1002) than to the other two marginal edges (e.g., 1000 and 1003). This off-center location of brush biasing assemblies 90a and 90b allows polisher 950 to follow an elliptical orbit about an axis perpendicular to the front face of polisher 950 and equidistant between shafts 160a and 160b. The elliptical orbit of polisher 950 will cause abrasive brush 990 to sufficiently abrade surface 20 for polishing a preselected relatively large area of surface 20.

Fifth Embodiment of The Invention

Figure 14:
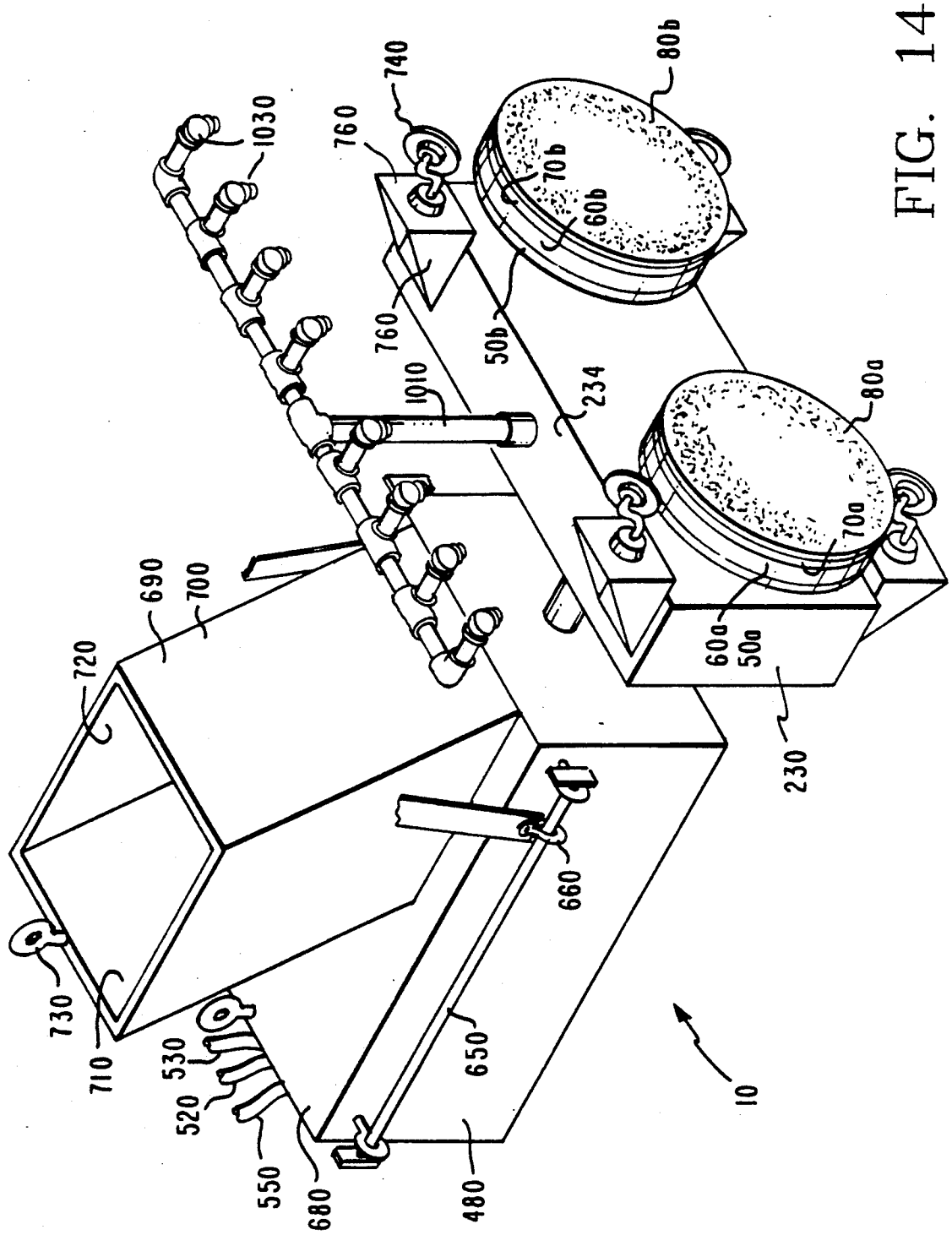
FIG. 14 is a perspective view of a fifth embodiment of the invention.
Figure 15:
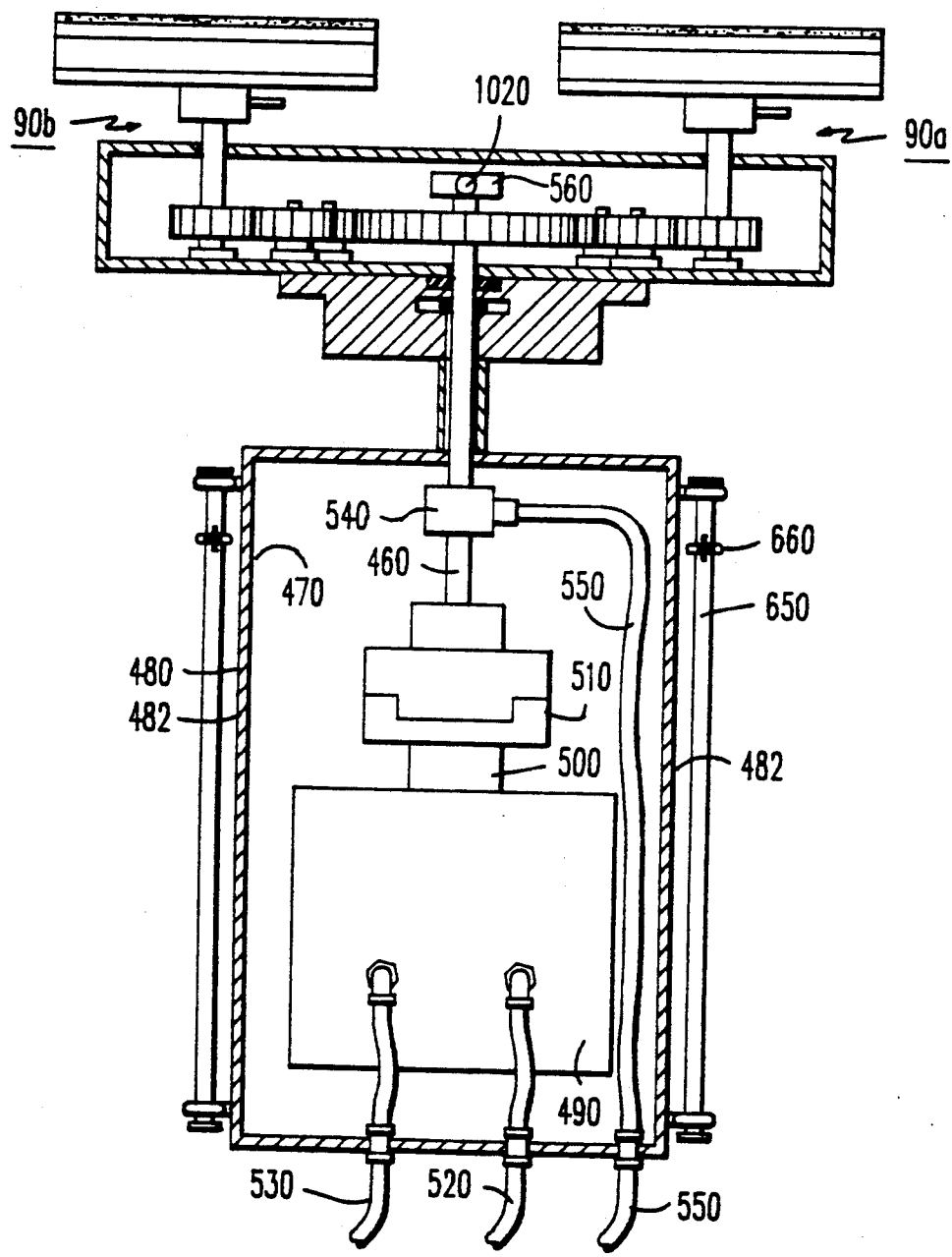
FIG. 15 shows, in partial horizontal section, the fifth embodiment of the invention.

Referring to FIGS. 14 and 15, there is shown the fifth embodiment of the invention. The fifth embodiment of the invention is substantially similar to the first embodiment of the invention except that first tube 570 and second tube 580 (see FIG. 3) are not used and may be replaced by a hollow spray pipe 1010, which may be generally T-shaped. The hollow portion of spray pipe 1010 is in fluid communication with the plenum chamber (not shown) in conduit manifold 560. Conduit manifold 560 has a fluid hole 1020 for passage therethrough of the wetting agent flowing into conduit manifold 560 from conduit 450 (see FIG. 6). It will be understood that spray pipe 1010 is connected to fluid hole 1020 for passage of the wetting agent from conduit manifold 560 into spray pipe 1010. Spray pipe 1010 may be provided with a plurality of adjustably swivable spray nozzles 1030 thereon for directing the wetting agent issuing therefrom onto surface 20. As shown in FIG. 14, spray pipe 1010 may be configured to spray an area of surface 20 larger than the area of surface 20 sprayable by first jet nozzle 630 and second jet nozzle 640 (see FIG. 3).

Method of the First, Second, and Third Embodiments of the Invention

The method of the first, second, and third embodiments of the invention comprises placing a predetermined amount of ballast (not shown), such as lead bricks or the like, into container 690 for suitably balancing apparatus 10 against surface 20 so that surface 20 is suitably scrubbed when apparatus 10 is operated. Placing ballast into container 690 will create a principal angular moment of inertia into surface 20. Moreover, ballast may also be placed into housing 480 in the free space surrounding motor 490, drive coupling 510, and liquid supply coupler 540. It will be understood that the ballast will relocate the center of gravity of apparatus 10 so that brushes 80a and 80b will provide a sufficient bearing pressure against surface 20, thus maintaining brushes 80a and 80b in intimate contact with surface 20. Because sufficient ballast may be placed in the space surrounding motor 490, drive coupling 510, and liquid supply coupler 540, container 690 may be deleted if desired. However, placing a predetermined amount of ballast into container 690 and into the space surrounding motor 490, drive coupling 510 and liquid supply coupler 540 will more accurately control the relocation of the center of gravity of apparatus 10. The method of the first, second, and third embodiments of the invention further comprises positioning apparatus 10 opposite that portion of surface 20 to be remotely decontaminated, scrubbed or cleaned. In this regard, lift cables 670, which are attached to lifting lugs 660, are connected to an overhead crane (not shown). The overhead crane is then activated for moving apparatus 10, via lift cables 670, to the portion of surface 20 to be remotely scrubbed. Lifting lugs 660 are slidably adjusted along their associated lift bars 650 for balancing apparatus 10 so that brush means 40 is substantially flush with and abuts against surface 20 for suitably scrubbing surface 20. Because ballast may also be placed in the space surrounding motor 490, drive coupling 510, and liquid supply coupler 540, the angular moment of inertia referred to hereinabove may be adjusted or changed by suitably sliding lifting lugs 660 along their associated lift bars 650. Suitably adjusting the angular moment of inertia enables brush means 40 to make full contact with and to bear against surface 20 for scrubbing surface 20.

It will be understood that when brush means 40 is positioned against surface 20 in the manner recited hereinabove, casters 740 will repose against surface 20 for sliding on surface 20 and for positioning brush means 40 substantially flush against surface 20. Caster supports 760 are capable of being individually adjusted, if required, to position brush means 40 against surface 20. In this regard, any one of caster supports 760 may be adjusted by unscrewing fastener 790 from aperture 780 and its associated hole, which hole may be in top panel 234 or bottom panel 235. Caster support 760 is then slidably translated either toward or away from surface 20 for moving caster 760, which is attached to caster support 760, either toward or away from surface 20. Thus, translating each caster support 760 toward or away from surface 20 can position brush means 40 flush against surface 20 for allowing brush means 40 to suitably decontaminate or scrub surface 20.

Once brush means 40 is positioned against surface 20, the wetting agent may be supplied to liquid supply line 550 and thus to conduit 450. The wetting agent supplied to conduit 450 will flow through conduit 450 to the plenum chamber (not shown) in conduit manifold 560 and then to first tube 570 and to second tube 580. The wetting agent that flows through first tube 570 and through second tube 580 will flow through first fixture 590 and through second fixture 600, respectively. This wetting agent then flows from first fixture 590 and second fixture 600 through first nozzle connection 610 and second nozzle connection 620, respectively. Because first jet nozzle 630 and second jet nozzle 640 are connected to their respective first nozzle connection 610 and second nozzle connection 620, the wetting agent flowing through first nozzle connection 610 and through second nozzle connection 620 will also flow through first jet nozzle 630 and through second jet nozzle 640. The wetting agent passing through first jet nozzle 630 and second jet nozzle 640 then passes through the space defined by spaced-apart brushes 80a and 80b and impinges surface 20 for wetting surface 20. It will be appreciated that wetting surface 20 will increase and enhance the cleaning or scrubbing effectiveness of brush means 40.

Motor 490 is operated to generate torque for rotating drive axle 430 which is connected to motor 490. If motor 490 is an air operated motor, then motor 490 is operated by supplying compressed air to motor 490 via air supply line 520. Of course, the air supplied to motor 490 is necessarily exhausted from motor 490 through air return line 530. The rotation of drive axle 430 will operate the drive means which in turn will simultaneously rotate first shaft 160a and second shaft 160b. Shafts 160a and 160b will rotate in the same direction, either clockwise or counter-clockwise, due to the configuration of the drive means described hereinabove. As shafts 160a and 160b rotate, their associated first brush biasing assembly 90a and second brush biasing assembly 90b will also rotate because brush biasing assemblies 90a and 90b are connected to their associated shafts 160a and 160b. Rotation of first brush biasing assembly 90a and second biasing assembly 90b will cause first brush 80a and second brush 80b to rotate for scrubbing surface 20.

It is important that brush means 40 remain in intimate contact with surface 20 for suitably scrubbing surface 20. Therefore, even if surface 20 is uneven, each spring 140, which belongs to brush biasing assemblies 90a and 90b, will bias brush means 40 into intimate contact with surface 20. That is, spring 140 will exert a force against mounting disks 50a and 50b because spring 140 is interposed between mounting disk 50a and 50b and each flange 170.

As described hereinabove, first brush 80a and second brush 80b will rotate in the same direction due to the configuration of the drive means described hereinabove. Moreover, as brushes 80a and 80b rotate on surface 20, they will cause enclosure 480 to rotate in the same direction as the direction of rotation of brushes 80a and 80b because enclosure 480 is freely rotatable in a plane perpendicular to the axis parallel to and generally equidistant between shafts 160a and 160b. As enclosure 480 rotates in the manner described hereinabove, brushes 80a and 80b will orbit about the axis equidistant between brushes 80a and 80b. That is, as brushes 80a and 80b rotate or spin on the axes passing longitudinally through shafts 160a and 160b, respectively, an asymmetrical thrust will be created and cause enclosure 480 to rotate for orbiting brushes 80a and 80b. Thus, brushes 80a and 80b will not only rotate for scrubbing an area of surface 20, they will also simultaneously orbit as brushes 80a and 80b rotate for scrubbing a larger area of surface 20. It will be understood that the orbiting feature of brushes 80a and 80b allow brushes 80a and 80b to scrub a surface area larger than the surface area that otherwise could be scrubbed if brushes 80a and 80b were not orbitable. Scrubbing a larger surface area per cleaning or decontamination pass will reduce the radiation exposure time to the operator of apparatus 10 because less time will be required to clean surface 20. Moreover, the disk shape of brushes 80a and 80b will allow brushes 80a and 80b to clean the vertical and horizontal edge crevices (not shown) where the walls of the reactor cavity meet.

After apparatus 10 has sufficiently scrubbed a portion of surface 20, apparatus 10 may be horizontally translated to another portion of surface 20 by operating the overhead crane (not shown) to which cables 670 are connected. Apparatus 10 is then operated to scrub that portion of surface 20 to which apparatus 10 has been translated. After apparatus 10 has scrubbed a preselected horizontal strip of surface 20 by passing horizontally along surface 20, it may be lowered or raised and then translated to scrub another horizontal strip of surface 20, the second horizontal strip overlapping the first horizontal strip. The above process can be repeated until all of surface 20 is suitably scrubbed.

Method of the Fourth Embodiment of the Invention

The method of the fourth embodiment of the invention polishes surface 20 for removing particulate matter and for improving the aesthetic appearance of surface 20, which may be stainless steel. In the method of the fourth embodiment of the invention, the off-center location of shafts 80a and 80b translates polisher 950 in an elliptical orbit in a plane about an axis parallel to and equidistant between shafts 160a and 160b. In this method of the invention, a wetting agent need not be applied to surface 20, unless desired by the operator of apparatus 10.

Method of the Fifth Embodiment of the Invention

In the method of the fifth embodiment of the invention, the wetting agent flows from the plenum chamber of conduit manifold 560 to spray pipe 1010 and thence to spray nozzles 1030 for wetting surface 20. Using spray pipe 1010 can allow a larger area of surface 20 to be impinged with the wetting agent compared to using first jet nozzle 630 and second jet nozzle 640.

Of course it will be understood that modifications and variations to the invention may be effected without departing from the spirit and scope of the novel concepts of the present invention.

Therefore, this invention provides an apparatus and method for remotely decontaminating, cleaning, or scrubbing vertical surfaces, such as nuclear reactor cavity walls, wherein the apparatus includes brush means for cleaning an area of the surface of the wall, drive means connected to the brush means for rotating the brush means, means connected to the brush means for simultaneously orbiting the brush means as the brush means rotates to clean a larger area of the surface of the wall. Moreover, the apparatus may alternatively include a polisher for polishing the surface of the wall.

What is claimed is:

1. An apparatus for scrubbing an uneven surface, comprising:
   (a) brush means for scrubbing the surface;
   (b) a coiled spring contacting said brush means for biasing said brush means against the surface;
   means mounting said coil spring adjacent said brush means;
   (c) drive means connected to said brush means for rotating said brush means to scrub an area of the surface; and
   (d) drive means connected to said brush means for orbiting said brush means to scrub a larger area of the surface.

2. The apparatus according to claim 1, further comprising an adjustable jet nozzle disposed proximate said brush means for dispensing a fluid upon the surface.

3. The apparatus according to claim 2, further comprising a ballast container connected to said brush means for receiving ballast therein for pressing said brush means against the surface.

4. The apparatus according to claim 1, wherein said drive means is a gear drive sealingly enlcosed within said orbiting means.

5. The apparatus according to claim 1, wherein said drive means is a chain drive, after sealingly enclosed within said orbiting means.

6. The apparatus according to claim 1, wherein said drive means is a a belt drive, after sealingly enclosed within said orbiting means.

7. An apparatus for scrubbing the surface of a vertical wall, comprising:
   (a) a first shaft having a proximal end portion and a distal end portion;
   (b) a second shaft having a proximal end portion and a distal end portion, said second shaft parallel to and spaced-apart from said first shaft;
   (c) a first brush connected to the proximal end portion of said first shaft for cleaning the surface;
   (d) a second brush connected to the proximal end portion of said second shaft for cleaning the surface;
   (e) a sealed enclosure defining a cavity therein, said enclosure connected to the distal end portion of said first shaft and to the distal end portion of said second shaft;
   (f) a first brush biasing assembly connected to said first brush for biasing said first brush against the surface; and
   (g) a second brush biasing assembly connected to said second brush for biasing said second brush against the surface.

8. The apparatus according to claim 7, further comprising:
   (a) drive means disposed in the cavity defined by said enclosure for simultaneously rotating said first shaft and said second shaft, said drive means connected to said first shaft for rotating said first shaft and connected to said second shaft for rotating said second shaft; and
   (b) an adjustable fluid dispenser connected to said enclosure for dispensing a fluid upon the surface.

9. The apparatus according to claim 8, further comprising:
   (a) a housing connected to said enclosure;
   (b) a rotatable drive axle having a proximal end portion connected to said drive means for operating said drive means and having a distal end portion terminating in said housing; and
   (c) motor means disposed in said housing and connected to the distal end portion of said drive axle for rotating said drive axle.

10. The apparatus according to claim 9, wherein said drive axle defines a conduit therein extending from the proximal end portion of said drive axle to near the distal end portion of said drive axle for conducting a fluid therethrough.

11. The apparatus according to claim 10, further comprising a tube extending from the conduit of said drive axle to said fluid dispenser for conducting the fluid from said conduit to said fluid dispenser.

12. The apparatus according to claim 11, further comprising a liquid supply hose in fluid communication with the conduit for supplying the fluid to the conduit.

13. The apparatus according to claim 17, wherein said motor means is of variable speed for varying the speed of rotation of said drive axle.

14. The apparatus according to claim 13 wherein said motor means is reversible for reversing the direction of rotation of said drive axle.

15. The apparatus according to claim 14, wherein said motor means is air operated.

16. The apparatus according to claim 15, further comprising:
   (a) an air delivery hose connected to said motor means for delivering air to said motor means for operating said motor means; and
   (b) an air return hose connected to said motor means for conducting the air exhausted from said motor means.

17. The apparatus according to claim 16, further comprising a ballast container attached to said housing for receiving ballast therein.

18. The apparatus according to claim 17, further comprising lifting bars attached to said housing for positioning said housing and said enclosure along the surface.

19. The apparatus according to claim 18, wherein said drive means is a chain drive.

20. The apparatus according to claim 18, wherein said drive means is a chain drive.

21. The apparatus according to claim 18, wherein said drive means is a belt drive.

22. An apparatus for remotely decontaminating the surface of a vertical reactor cavity wall, comprising:
   (a) a generally cylindrical first shaft having a proximal end portion and a distal end portion;
   (b) a generally cylindrical second shaft, said second shaft spaced-apart from said first shaft and disposed substantially parallel to said first shaft, said second shaft having a proximal end portion and a distal end portion;
   (c) a first mounting disk connected to the proximal end portion of said first shaft;
   (d) a disk-shaped first brush mounted on said first mounting disk;
   (e) a first brush biasing assembly attached to said first mounting disk for biasing said first brush against the surface;
   (f) a second mounting disk connected to the proximal end portion of said second shaft;
   (g) a disk-shaped second brush mounted on said second mounting disk;
   (h) a second brush biasing assembly attached to said second mounting disk for biasing said second brush against the surface;
   (i) drive means connected to the distal end portion of said first shaft for rotating said first shaft and connected to the distal end portion of said second shaft for rotating said second shaft;
   (j) a box-shaped enclosure defining a cavity therein, said enclosure surrounding said drive means and rotatably connected to said first shaft and to said second shaft;
   (k) a housing disposed near said enclosure and connected thereto, said housing having an inside;
   (l) a generally cylindrical drive axle having a proximal end portion connected to said drive means for operating said drive means and having a distal end portion, said drive axle extending from the cavity defined by said enclosure to the inside of said housing, said drive axle defining a conduit therein extending from the proximal end portion to near the distal end portion of said drive axle for conducting a fluid therethrough; and
   (m) a motor disposed inside said housing and connected to the distal end portion of said drive axle for rotating said drive axle.

23. The apparatus according to claim 22, wherein said drive means is a gear drive.

24. The apparatus according to claim 23, wherein said gear drive is a plurality of gears.

25. The apparatus according to claim 24, wherein said plurality of gears comprises:
   (a) a first gear connected to the distal end portion of said first shaft for rotating said first shaft, said first gear having first gear teeth thereon;
   (b) a second gear rotatably connected to said enclosure and disposed in the cavity of said enclosure, said second gear having second gear teeth thereon for matingly engaging the first gear teeth of said first gear;
   (c) a third gear attached to the distal end portion of said second shaft for rotating said second shaft, said third gear having third gear teeth thereon;
   (d) a fourth gear rotatably connected to said enclosure and disposed in the cavity of said brush arm, said fourth gear having fourth gear teeth thereon; and
   (e) a main gear attached to said drive axle, said main gear having main gear teeth thereon for matingly engaging the second gear teeth of said second gear and for matingly engaging the fourth gear teeth of said fourth gear.

26. The apparatus according to claim 25, wherein said motor is of variable speed for varying the speed of said drive axle.

27. The apparatus according to claim 26, wherein said motor is reversible for reversing the direction of rotation of said drive axle.

28. The apparatus according to claim 27, wherein said motor is air operated.

29. The apparatus according to claim 28, further comprising an air delivery hose connected to said motor for operating said motor.

30. The apparatus according to claim 29, further comprising an air return hose connected to said motor for conducting the air exhausted from said motor.

31. The apparatus according to claim 30, further comprising a fluid delivery hose in fluid communication with the conduit defined by said drive axle for delivering fluid to the conduit.

32. The apparatus according to claim 31, further comprising a fluid dispensing jet nozzle attached to said enclosure for dispensing fluid upon the surface, said jet nozzle in fluid communication with the conduit defined by said drive axle.

33. The apparatus according to claim 32, further comprising a lift bar connected to said housing for positioning said housing and said enclosure along the surface of the wall.

34. The apparatus according to claim 33, further comprising a lifting lug slidably connected to said lift bar for receiving a lifting cable to position said housing and said enclosure along the surface of the wall. gear.

35. The apparatus according to claim 22, wherein said drive means is a belt drive.

36. The apparatus according to claim 35, wherein said belt drive is a plurality of pulleys.

37. The apparatus according to claim 36, wherein said plurality of pulleys comprise:
   (a) a first pulley attached to the distal end portion of said first shaft for rotating said first shaft;

(b) a second pulley attached to the distal end portion of said second shaft for rotating said second shaft;
(c) a first main pulley attached to said drive axle for rotating said first main pulley;
(d) a second main pulley attached to said drive axle for rotating said second main pulley;
(e) a first belt circumscribing said first pulley and said first main pulley for rotating said first pulley; and
(f) a second belt circumscribing said second pulley and said second main pulley for rotating said second pulley.

* * * * *